US012715567B2

(12) United States Patent
Ito et al.

(10) Patent No.: US 12,715,567 B2
(45) Date of Patent: Aug. 25, 2026

(54) EXHAUST SYSTEM

(71) Applicant: Yanmar Holdings Co., Ltd., Osaka (JP)

(72) Inventors: Kazuhisa Ito, Akashi City (JP); Yoshinori Fukui, Osaka (JP); Shunji Hamaoka, Osaka (JP); Hiroshi Uehara, Osaka (JP); Masato Nakai, Kobe (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 572 days.

(21) Appl. No.: 18/197,532

(22) Filed: May 15, 2023

(65) Prior Publication Data

US 2023/0406474 A1 Dec. 21, 2023

(30) Foreign Application Priority Data

May 18, 2022 (JP) ................................ 2022-081851
Dec. 20, 2022 (JP) ................................ 2022-203573

(51) Int. Cl.
*B63J 2/06* (2006.01)
*B63B 43/00* (2006.01)
(Continued)

(52) U.S. Cl.
CPC ................ *B63J 2/06* (2013.01); *B63B 43/00* (2013.01); *B63B 45/06* (2013.01); *B63B 79/10* (2020.01); *F02B 77/08* (2013.01)

(58) Field of Classification Search
CPC ........ B63H 21/32; B63H 21/34; B63H 21/14; B63H 20/245; B63H 21/38; B63J 2/06; B63J 2/02; B63J 2/10; B63B 43/00; B63B 45/06; B63B 79/10; B63B 17/00; B63B 45/00; B63B 2241/20; F02B 77/08; F02B 75/02; F02B 63/04; F02B 2075/025;
(Continued)

(56) References Cited

U.S. PATENT DOCUMENTS

| | | | | |
|---|---|---|---|---|
| 3,407,879 A * | 10/1968 | O'Rear | .................. | A62C 3/006 169/30 |
| 2015/0136430 A1* | 5/2015 | Livchak | .............. | F24C 15/2021 169/61 |
| 2016/0265790 A1* | 9/2016 | Dahan | ................ | F24C 15/2071 |

FOREIGN PATENT DOCUMENTS

| | | |
|---|---|---|
| JP | S6232374 A | 10/1986 |
| JP | S61232374 A * | 10/1986 |

(Continued)

OTHER PUBLICATIONS

JP_H02100994_U Machine Translation (Year: 1989).*
(Continued)

*Primary Examiner* — Marc Q Jimenez
*Assistant Examiner* — Eric Anthony Starck
(74) *Attorney, Agent, or Firm* — NORTON ROSE FULBRIGHT US LLP

(57) ABSTRACT

An exhaust system according to an aspect of the present disclosure includes: an exhaust duct provided above a marine internal combustion engine installed in an engine room of a ship; and a suction fan that sucks a fuel leakage gas leaking from the marine internal combustion engine into the inside of the exhaust duct from an engine upper unit side of the marine internal combustion engine. The exhaust duct exhausts the fuel leakage gas sucked by the suction fan to the outside of the engine.

16 Claims, 17 Drawing Sheets

(51) Int. Cl.

| | |
|---|---|
| ***B63B 45/06*** | (2006.01) |
| ***B63B 79/10*** | (2020.01) |
| ***F02B 77/08*** | (2006.01) |

(58) Field of Classification Search

CPC .. F02B 23/08; F02B 2075/027; F02B 63/042; F02B 61/045; F01N 2570/18; F01N 13/004; F01N 2590/02; A62C 2/10; A62C 3/006; F17C 2260/037; F17C 2260/038; F17C 2270/0105; F17C 2260/042; F24C 15/2078; F24C 15/2085; F24C 15/2092; Y02T 10/30

USPC .......................................................... 114/211

See application file for complete search history.

(56) References Cited

FOREIGN PATENT DOCUMENTS

| | | | | | |
|---|---|---|---|---|---|
| JP | H02100994 | U | * | 8/1990 | |
| JP | H05203152 | A | * | 8/1993 | .......... F24C 15/2085 |
| JP | 2019-090353 | A | | 6/2019 | |
| KR | 1020090019418 | A | | 2/2009 | |
| KR | 20150032997 | A | * | 4/2015 | ............... A62C 3/10 |
| KR | 1020160006986 | A | | 1/2016 | |
| KR | 1020190026979 | A | | 3/2019 | |
| KR | 1020190118661 | A | | 10/2019 | |
| KR | 102079777 | B1 | * | 2/2020 | .......... F24F 13/0218 |
| KR | 102172063 | B1 | | 10/2020 | |
| KR | 1020220003466 | A | | 1/2022 | |
| WO | WO-2018110207 | A1 | * | 6/2018 | ....... F02M 35/10222 |
| WO | 2018185957 | A1 | | 10/2018 | |

OTHER PUBLICATIONS

JP_H02100994_U Google.com translation (Year: 1989).*

JP-H05203152-A Machine Translation (Year: 1993).*

The Aussie Seafarer "Inside a cargo ship—Engine Room Tour" [online]. YouTube.com, 2020 [uploaded on 2020-05-19]. Retrieved from the Internet: <URL: https://www.youtube.com/watch?v=rSYFX5VSdXY> (Year: 2020).*

KR-102079777-B1 Machine Translation (Year: 2020).*

KR-20150032997-A Machine Translation (Year: 2015).*

JP-S61232374-A text (Year: 1986).*

European Search Report dated Sep. 20, 2023 issued for EP Application No. 23173154.8.

Korean Office Action dated Feb. 16, 2025, issued in KR Application No. 10-2023-0057638.

* cited by examiner

EXHAUST SYSTEM

CROSS-REFERENCE TO RELATED APPLICATIONS

This application claims priority under 35 U.S.C. § 119 to JP Application No. 2022-081851 filed May 18, 2022 and JP Application No. 2022-203573 filed Dec. 20, 2022 the entire contents of which are hereby incorporated by reference.

TECHNICAL FIELD

The present disclosure relates to an exhaust system.

BACKGROUND ART

Previously, marine internal combustion engines (e.g., heavy oil combustion engines) are publicly known in which fossil fuels such as heavy oil are injected into a combustion chamber for combustion (see, for example, Patent Document 1). Generally, a marine internal combustion engine is mounted in the engine room of a ship, and takes in air, as a combustion gas, sent from the outside of the ship into the engine room by an air supply device such as a fan. The combustion gas is supplied into a cylinder through a pipe or the like of the marine internal combustion engine, and is compressed by a piston. The fossil fuel injected into the combustion chamber is ignited and burned by the compressed combustion gas. The marine internal combustion engine operates using energy generated by the combustion and generates the propulsion force of the ship. Further, the gas remaining in the combustion chamber after the combustion is delivered as an exhaust gas from the marine internal combustion engine to the outside of the engine through an exhaust pipe and the like, and is discharged from a chimney to the outside of the ship.

PRIOR ART DOCUMENT

Patent Document

Patent Document 1: JP-A-2019-90353

SUMMARY OF INVENTION

Technical Problem

In recent years, in the field of ships, marine internal combustion engines have been developed to which alternative fuels to replace conventional fossil fuels can be applied in order to reduce greenhouse gas (GHG) emissions. Note that the alternative fuel is a fuel that does not generate carbon dioxide even when combusted, such as ammonia or hydrogen. In such a marine internal combustion engine, for example, a fossil fuel and an alternative fuel are injected into a combustion chamber from a fuel injection valve provided in a cylinder, and are burned (mix-combusted) together.

In the case in which a marine internal combustion engine to which an alternative fuel can be applied as described above is mounted in the engine room of a ship, a gas derived from the alternative fuel leaked from the marine internal combustion engine may diffuse into the engine room. Note that as the gas derived from the alternative fuel leaked from the marine internal combustion engine, there are a toxic gas or a flammable gas that volatilizes after the alternative fuel such as ammonia or hydrogen leaks from the marine internal combustion engine in the liquid phase, and a toxic gas or a flammable gas that leaks in the gas phase before the leakage. In the following, these gases are collectively referred to as a fuel leakage gas. However, since the engine room is wide enough to install the marine internal combustion engine, it is difficult to ventilate the entire area of the engine room in the case in which the fuel leakage gas leaks from the marine internal combustion engine. Further, it is effective to use a large-capacity exhaust fan for ventilation of the engine room. However, even though a large-capacity exhaust fan is used, there is a possibility that the fuel leakage gas is conversely diffused into the engine room due to an airflow generated by the exhaust fan.

The present disclosure has been made in view of the above circumstances, and an object of the present disclosure is to provide an exhaust system capable of sufficiently exhausting a fuel leakage gas leaked from a marine internal combustion engine without diffusing the fuel leakage gas into an engine room.

Solution to Problem

In order to solve the above-described problems and achieve an object, an exhaust system according to the present disclosure includes: an exhaust duct provided above a marine internal combustion engine installed in an engine room of a ship; and a suction fan that sucks a fuel leakage gas leaking from the marine internal combustion engine into an inside of the exhaust duct from an engine upper unit side of the marine internal combustion engine. The exhaust duct exhausts the fuel leakage gas sucked by the suction fan to an outside of the engine room.

Further, in the disclosure, an exhaust system according to the present disclosure further includes an exhaust hood that opens larger than the exhaust duct and communicates the engine upper unit with the inside of the exhaust duct. A cylinder of the marine internal combustion engine is included in the engine upper unit, and the exhaust hood covers at least an upper side of the cylinder.

Further, in the disclosure, in an exhaust system according to the present disclosure, the marine internal combustion engine includes an upper passage provided along the engine upper unit, and a fence erected along an outer edge of the upper passage. The exhaust hood covers an upper side of an inner region surrounded by the fence.

Further, in the disclosure, in an exhaust system according to the present disclosure, the engine upper unit further includes a supercharger that sucks air from an outside and compresses the air, and the marine internal combustion engine includes an upper passage provided along the engine upper unit, and a fence erected along an outer edge of the upper passage. The exhaust hood covers an upper side of a region excluding the supercharger in an inner region surrounded by the fence.

Further, in the disclosure, in an exhaust system according to the present disclosure, the engine upper unit includes a plurality of cylinders of the marine internal combustion engine, and a plurality of the exhaust ducts is provided so as to open toward each of the plurality of cylinders.

Further, in the above disclosure, an exhaust system according to the present disclosure further includes an exhaust hood that opens larger than the exhaust duct from the exhaust duct toward the engine upper unit and communicates the engine upper unit of the engine with the inside of the exhaust duct, and the exhaust hood covers an upper side of the plurality of cylinders.

Further, in the disclosure, in an exhaust system according to the present disclosure, a plurality of the exhaust hoods is provided so as to cover the upper side of the plurality of cylinders.

Further, in the disclosure, in an exhaust system according to the present disclosure, the exhaust duct includes an expansion/contraction unit that extends in an approaching direction approaching the engine upper unit and contracts in a separating direction separating from the engine upper unit.

Further, in the disclosure, in an exhaust system according to the present disclosure, the exhaust duct includes a deformable unit that is bendable and deformable.

Further, in the disclosure, an exhaust system according to the present disclosure further includes a shield that shields at least the cylinder of the engine upper unit including the cylinder of the marine internal combustion engine.

Further, in the disclosure, an exhaust system according to the present disclosure includes a detector that detects the fuel leakage gas sucked into the inside of the exhaust duct by the suction fan; a notification unit that notifies presence or absence of the fuel leakage gas; and a controller that controls the notification unit to notify that the fuel leakage gas is present based on detection of the fuel leakage gas.

Further, in the disclosure, an exhaust system according to the present disclosure further includes a sprinkler that sprays water on at least the engine upper unit of the marine internal combustion engine. The detector detects a content of the fuel leakage gas contained in the gas sucked into the inside of the exhaust duct, and the controller compares a preset threshold with a content of the fuel leakage gas, and controls the sprinkler to spray water when the content of the fuel leakage gas exceeds the threshold.

Further, in the disclosure, an exhaust system according to the present disclosure further includes a floodlight unit that illuminates the engine upper unit.

Further, in the disclosure, in an exhaust system according to the present disclosure, the exhaust hood covers an upper side of an internal combustion engine system including the marine internal combustion engine and an ancillary device attached to the marine internal combustion engine.

Advantageous Effects of Invention

According to the present disclosure, the effect is exerted that it is possible to sufficiently exhaust the fuel leakage gas leaked from the marine internal combustion engine without diffusing the fuel leakage gas into the engine room.

DESCRIPTION OF EMBODIMENTS

Figure 1:
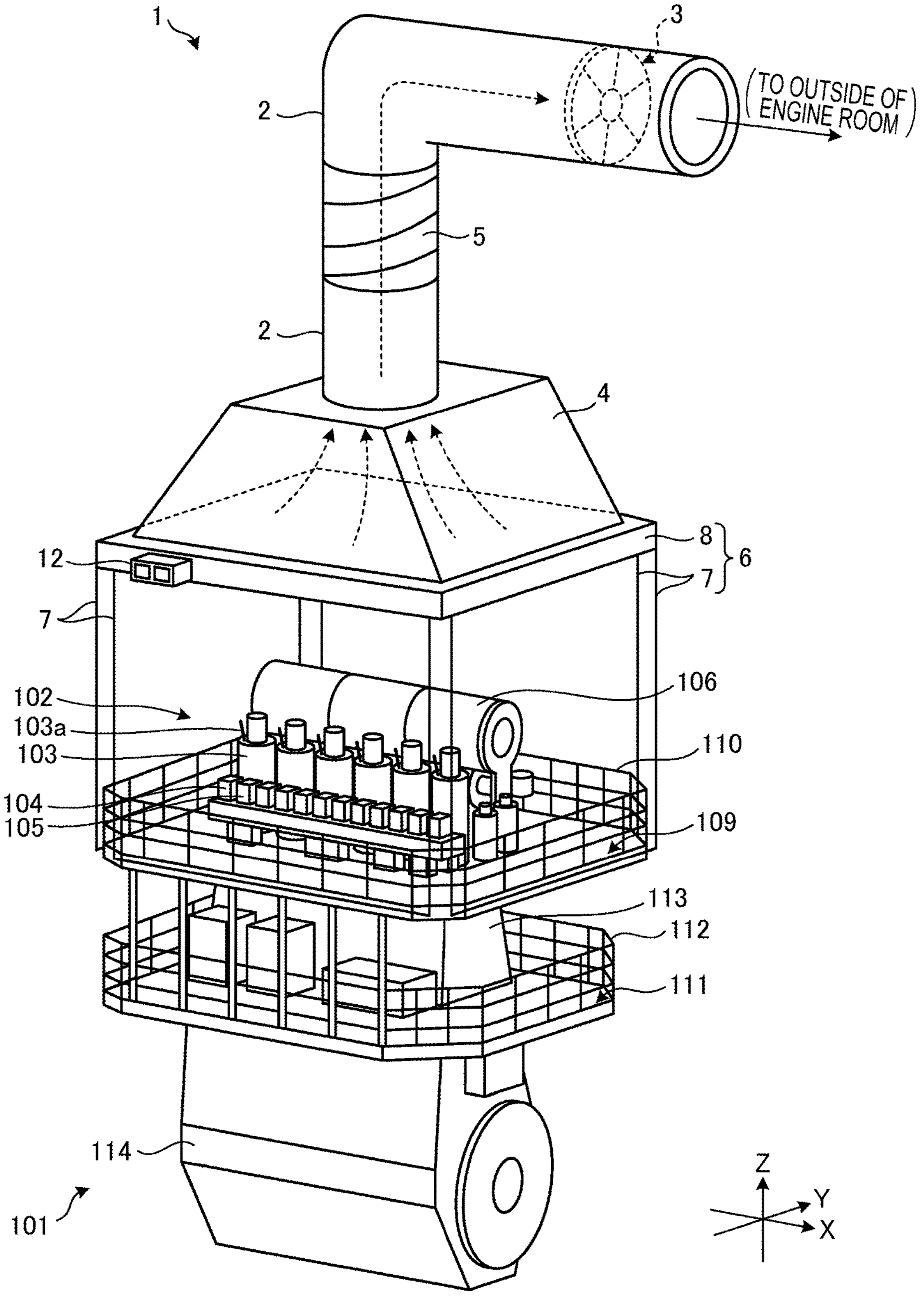
FIG. 1 is a perspective view showing a configuration example of an exhaust system according to a first embodiment of the present disclosure.

In the following, a preferred embodiment of an exhaust system according to the present disclosure will be described in detail with reference to the accompanying drawings. Note that the present disclosure is not limited by the present embodiment. Further, it should be noted that the drawings are schematic, and dimensional relationships of respective elements, ratios of respective elements, and the like may be different from actual ones. Portions having different dimensional relationships and ratios may be included between the drawings. Further, in the drawings, the same components are denoted by the same reference numerals.

First Embodiment

An exhaust system according to a first embodiment of the present disclosure will be described. In the following, for convenience of description, an X-axis direction, a Y-axis direction, and a Z-axis direction of a three-dimensional orthogonal coordinate system are set for a marine internal combustion engine in an engine room of a ship and an exhaust system of the present disclosure that exhausts a leaked gas (a fuel leakage gas, described later) from the marine internal combustion engine to the outside of the engine room. The X-axis direction is a direction parallel to the long-side direction (crankshaft direction) of the crankshaft of the marine internal combustion engine. The Z-axis direction is a height direction (vertical direction) of the marine internal combustion engine, and is, for example, a direction parallel to a long-side direction (piston-axis direction) of a piston shaft of the marine internal combustion engine. The Y-axis direction is a direction perpendicular to the X-axis direction and the Z-axis direction. Note that these directions do not limit the present disclosure.

Figure 2:
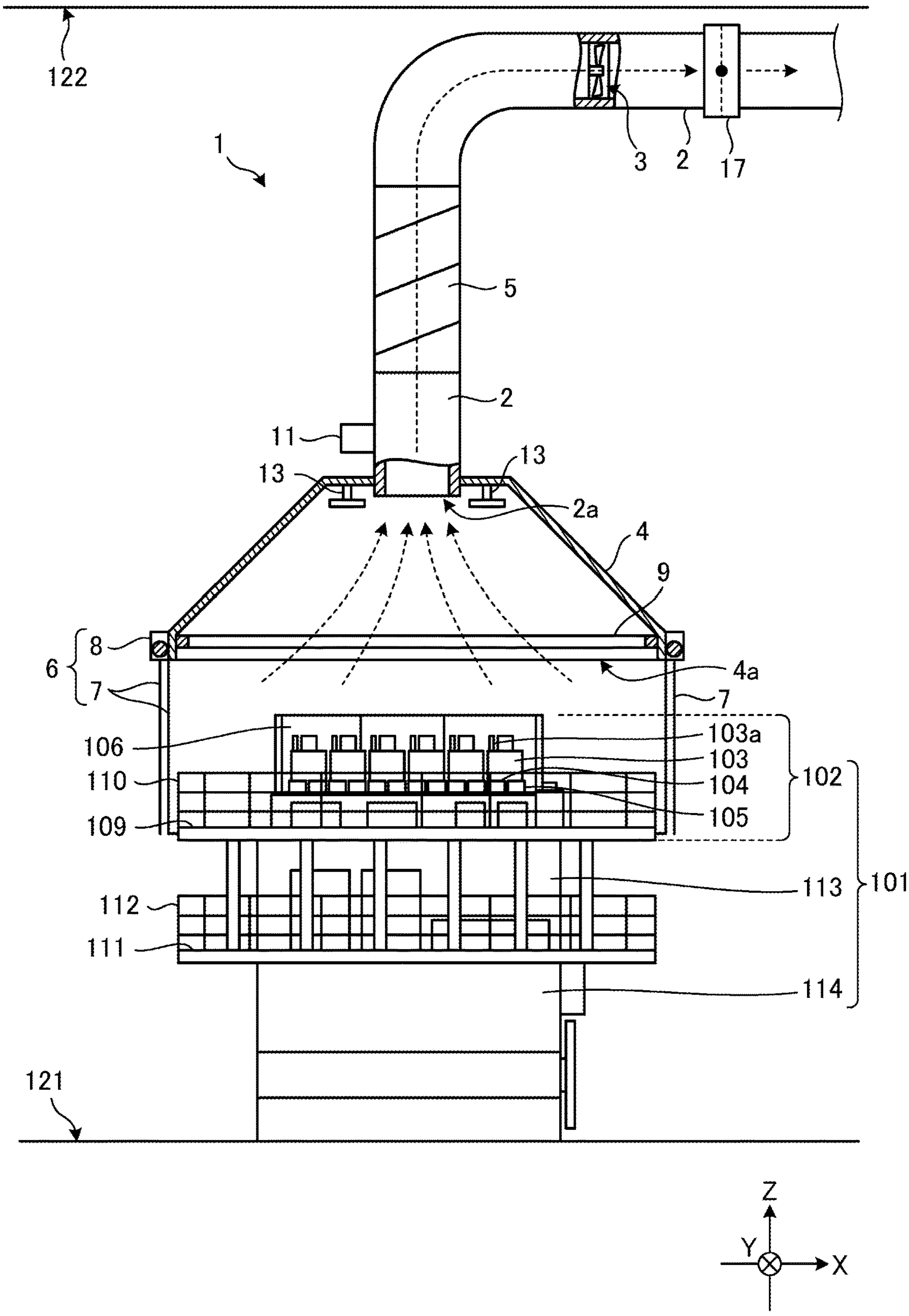
FIG. 2 is a diagram of the exhaust system shown in FIG. 1 as viewed from a Y-axis direction.
Figure 3:
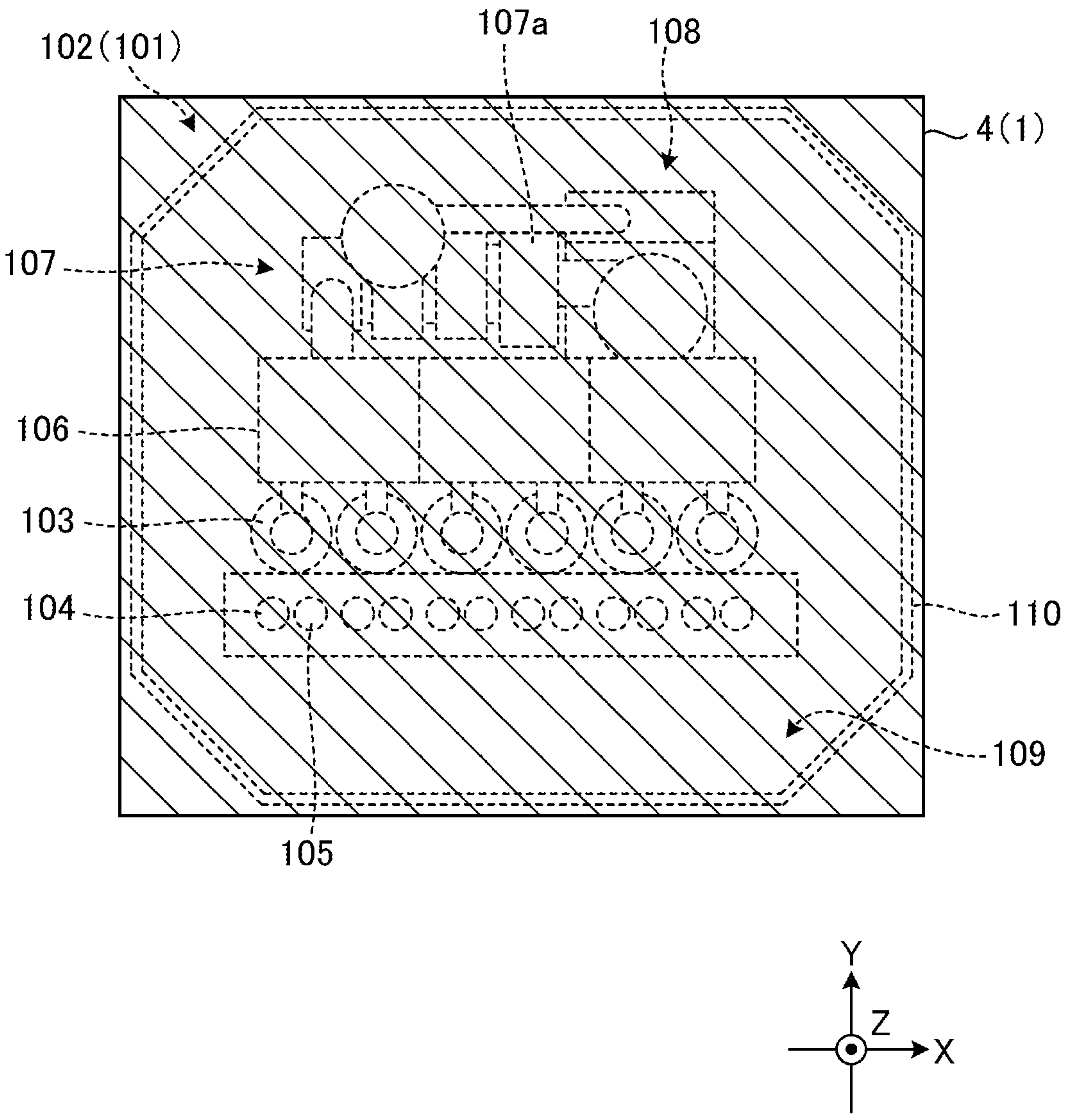
FIG. 3 is a diagram showing an example of a state where an engine upper unit of a marine internal combustion engine is covered by the exhaust system shown in FIG. 1.
Figure 4:
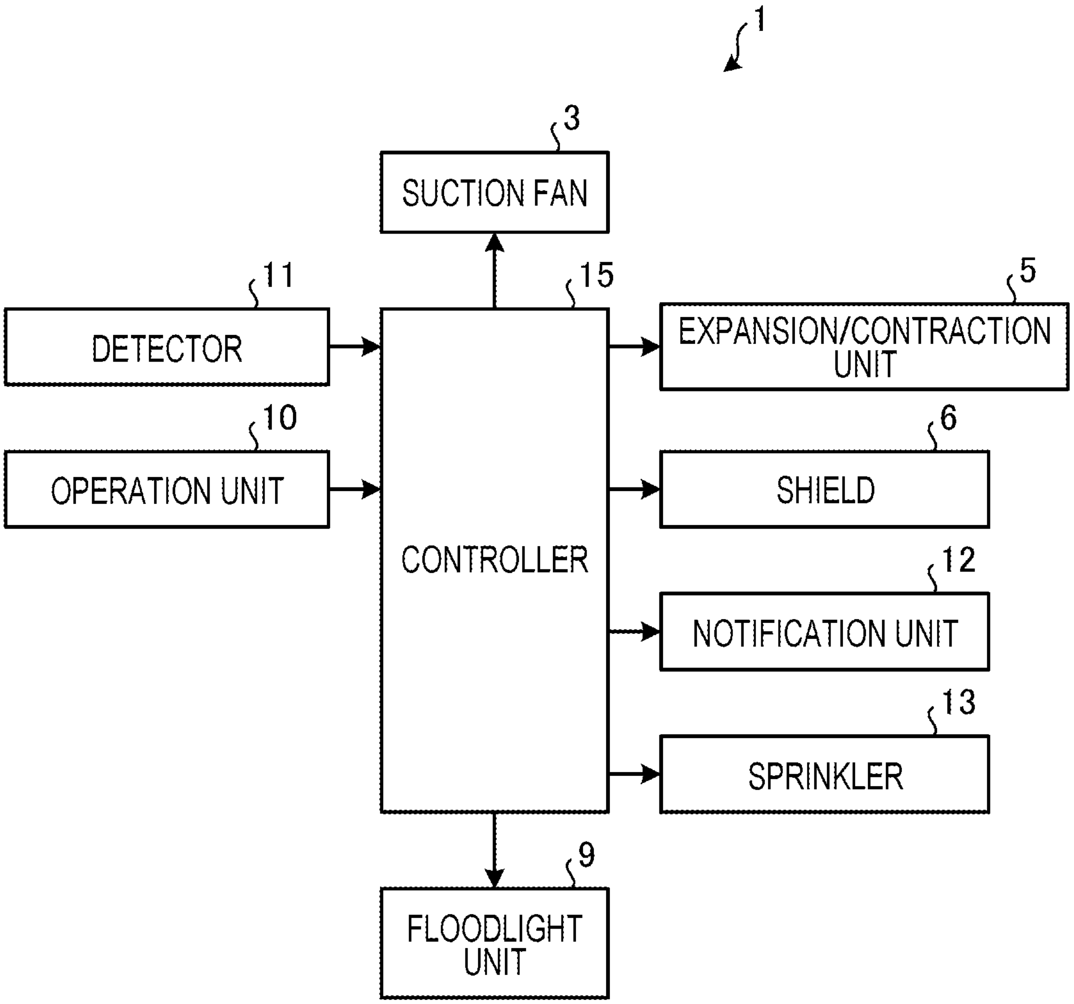
FIG. 4 is a block diagram showing an example of a drive configuration of an exhaust system according to a first embodiment of the present disclosure.

FIG. 1 is a perspective view showing a configuration example of an exhaust system according to a first embodiment of the present disclosure. FIG. 2 is a diagram of the exhaust system shown in FIG. 1 as viewed from the Y-axis direction. FIG. 2 is a partially cutaway view of this exhaust system 1 to facilitate description of the internal configuration of the exhaust system 1. FIG. 3 is a diagram showing an example of a state where the engine upper unit of the marine internal combustion engine is covered by the exhaust system shown in FIG. 1. FIG. 4 is a block diagram showing an example of a drive configuration of the exhaust system according to the first embodiment of the present disclosure.

A marine internal combustion engine 101 as a target in the first embodiment is, for example, an internal combustion engine of a type that operates by burning (mix-combusting) an ignition fuel and an alternative fuel in the combustion chamber of a cylinder 103, and is installed in the engine room of a ship. The ignition fuel is a fuel that is more likely to ignite than alternative fuels, such as fossil fuels, biofuels, or alcohol-based fuels (e.g., methanol). The fossil fuel is a fuel obtained by refining petroleum (crude oil), such as heavy oil or light oil. The alternative fuel is a fuel that can replace ignition fuel, and is a fuel effective for reducing emissions of GHGs, such as an ammonia fuel or hydrogen fuel. From the marine internal combustion engine 101 as described above, there is the case in which a fuel leakage gas volatilized from an alternative fuel leaks unintentionally due to damage of pipes and the like or unavoidably due to the maintenance of the cylinder 103 and the like. Examples of the fuel leakage gas include toxic flammable gases exemplified by an ammonia gas volatilized from an ammonia fuel, and non-toxic flammable gases exemplified by a hydrogen gas volatilized from a hydrogen fuel. Such a fuel leakage gas derived from alternative fuels is generally a gas lighter than air, and flows upward after leaking from an engine upper unit 102 including the cylinder 103 of the marine internal combustion engine 101.

Note that in the present specification, unless otherwise specified, a ship means a ship including the marine internal combustion engine 101, and an engine room means an engine room of a ship in which the marine internal combustion engine 101 is installed. Further, the fuel leakage gas means the fuel leakage gas leaked from the marine internal combustion engine 101 unless otherwise specified. The fuel leakage gas from the marine internal combustion engine 101 may be volatilized after leaking in the liquid phase from the marine internal combustion engine 101, or may be in a gas phase state before leaking and leaked in the gas phase from the marine internal combustion engine 101.

The exhaust system 1 according to the first embodiment sucks the fuel leakage gas leaked from the marine internal combustion engine 101 from above the engine upper unit 102 and exhausts the fuel leakage gas to the outside of the engine room. In detail, as shown in FIGS. 1 to 4, the exhaust system 1 includes an exhaust duct 2, a suction fan 3, an exhaust hood 4, an expansion/contraction unit 5, a shield 6, a floodlight unit 9, an operation unit 10, a detector 11, a notification unit 12, a sprinkler 13, a controller 15, and a shutoff valve 17.

The exhaust duct 2 is an example of a pipeline that guides (exhausts) the fuel leakage gas leaked from the marine internal combustion engine 101 installed in the engine room of the ship to the outside of the engine room, and is provided above the marine internal combustion engine 101. In detail, as shown in FIGS. 1 and 2, the exhaust duct 2 is laid in the engine upper unit (e.g., a ceiling 122 or the like) so as to open from above the marine internal combustion engine 101 toward the engine upper unit 102 of the marine internal combustion engine 101. A suction port 2*a* of the exhaust duct 2 is an opening that receives a gas sucked by the suction fan 3, described later, and as shown in FIG. 2, the suction port 2*a* opens from above the marine internal combustion engine 101 toward the engine upper unit 102. From the viewpoint of further shortening the suction path of the fuel leakage gas from the marine internal combustion engine 101 to the exhaust duct 2, the exhaust duct 2 preferably opens from directly above the marine internal combustion engine 101 toward the engine upper unit 102. That is, the suction port 2*a* of the exhaust duct 2 is preferably positioned directly above the marine internal combustion engine 101. The position directly above the marine internal combustion engine 101 described here is a position in a virtual projection plane obtained by projecting the entire area of the engine upper unit 102 including an upper passage 109 and an upper fence 110 (handrail) of the marine internal combustion engine 101 toward the ceiling 122 of the engine room in the Z-axis direction.

An exhaust port (not shown) of the exhaust duct 2 is an opening on the opposite side of the suction port 2*a*, and communicates with the outside of the engine room. For example, a pipe (not shown) leading to the outside of the ship is connected to the exhaust port of the exhaust duct 2. In this case, the exhaust duct 2 guides the fuel leakage gas sucked from the marine internal combustion engine 101 by the suction fan 3 from the engine room to the outside of the ship. Alternatively, the exhaust port of the exhaust duct 2 may be connected to a gas treatment device (not shown) provided in the ship. In this case, the fuel leakage gas discharged from the exhaust duct 2 may be stored after being subjected to treatment such as dissolution in water by the gas treatment device. Although not specifically shown, a reinforcing member such as a rib may be provided on the outer wall of the exhaust duct 2 to suppress the vibration of the exhaust duct 2 due to the shaking of the ship or the like.

Further, as shown in FIG. 2, the shutoff valve 17 is provided in the middle of the exhaust duct 2. The shutoff valve 17 is constituted of a damper or the like having an openable blade or the like, and is disposed, for example, at a site on the downstream side of the suction fan 3 in the gas flow direction in the middle of the exhaust duct 2. The shutoff valve 17 restricts the flow of a gas in the exhaust duct 2 in one direction by opening and closing a blade or the like. Specifically, the shutoff valve 17 allows a flow of a gas from the suction port 2*a* side of the exhaust duct 2 to the exhaust port side, and checks its backflow.

The suction fan 3 is an example of a device that sucks the fuel leakage gas leaked from the marine internal combustion engine 101. In detail, as shown in FIGS. 1 and 2, the suction fan 3 includes a drive unit (not shown), and is provided, for example, in the middle of the exhaust duct 2 (a site between the expansion/contraction unit 5 and the shutoff valve 17 in FIG. 2). The suction fan 3 rotates by the action of its drive unit to suck the fuel leakage gas from the engine upper unit 102 side into the inside of the exhaust duct 2 together with the gas in the engine room. The sucked gas (including the fuel leakage gas) flows from the suction port 2*a* side of the exhaust duct 2 to the exhaust port side by the action of the suction fan 3. In the following, the gas sucked by the suction fan 3 is collectively referred to as a suction gas. In the case in which a fuel leakage gas leaks from the marine internal combustion engine 101, the suction gas includes the fuel leakage gas. Note that the suction fan 3 may be disposed at any of the suction port 2*a*, the exhaust port, and the middle of the exhaust duct 2. However, from the viewpoint of reducing the weight (load) applied to the expansion/contraction unit 5, the suction fan 3 is preferably disposed at a site on the downstream side of the expansion/contraction unit 5 in the gas flow direction in the exhaust duct 2, and is more preferably disposed at a site fixed to the ceiling 122, a wall, or the like of the engine room.

The exhaust hood 4 is an example of a hood that easily sucks the fuel leakage gas from the marine internal combustion engine 101 into the inside of the exhaust duct 2. In detail, as shown in FIGS. 1 and 2, the exhaust hood 4 is formed in a tapered shape or the like expanding downward from the suction port 2*a* side of the exhaust duct 2, and is connected to the vicinity of the suction port 2*a* of the exhaust duct 2. The exhaust hood 4 opens larger than the exhaust duct 2, for example, from the exhaust duct 2 toward the engine upper unit 102, and communicates the engine upper unit 102 side with the inside of the exhaust duct 2. That is, an opening 4*a* of the exhaust hood 4 is larger than the suction port 2*a* of the exhaust duct 2 and faces the engine upper unit 102 side as shown in FIG. 2.

The exhaust hood 4 having this opening 4*a* covers at least the upper side of the cylinder 103 in the engine upper unit 102 of the marine internal combustion engine 101. For example, as shown in FIGS. 2 and 3, the engine upper unit 102 of the marine internal combustion engine 101 includes devices such as the cylinder 103, a first fuel pump 104 for an ignition fuel, a second fuel pump 105 for an alternative fuel, an exhaust manifold 106, and a supercharger 107. Further, the engine upper unit 102 includes the upper passage 109 having the upper fence 110. The upper fence 110 is in a state of surrounding the device of the engine upper unit 102 in a plan view as viewed from the upper side (positive side) in the Z-axis direction. For example, as shown in FIG. 3, the exhaust hood 4 covers the upper side of the inner region surrounded by the upper fence 110. In the first embodiment, the inner region includes the device of the engine upper unit 102 and the upper passage 109. The exhaust hood 4 receives the suction gas by the suction fan 3 from the inner region through the opening 4*a*, and concentrates the received suction gas on the suction port 2*a* of the exhaust duct 2 without leaking out of the exhaust hood 4.

Note that the exhaust hood 4 may cover solely the upper side of the inner region described above, or may cover the upper side of a partial region outside the upper fence 110 (a partial region in the engine room) as well as the upper side of the inner region as shown by hatching in FIG. 3. Specifically, preferably, the exhaust hood 4 covers the inner region from directly above the marine internal combustion engine 101.

The expansion/contraction unit 5 is an example of a pipeline that enables the exhaust duct 2 to expand and contract in the Z-axis direction. In detail, as shown in FIGS. 1 and 2, the expansion/contraction unit 5 is provided in the extension part of the exhaust duct 2 extending from above the marine internal combustion engine 101 (directly above in the first embodiment) toward the engine upper unit 102, and forms an expansion/contraction pipeline in the exhaust duct 2. The expansion/contraction unit 5 extends in an approaching direction approaching the engine upper unit 102. As a result, the expansion/contraction unit 5 is in an extended state (the state shown in FIGS. 1 and 2) in which the exhaust duct 2 is extended in the Z-axis direction, and brings the suction port 2*a* of the exhaust duct 2 close to the engine upper unit 102 together with the exhaust hood 4. Further, the expansion/contraction unit 5 contracts in a separating direction away from the engine upper unit 102. As a result, the expansion/contraction unit 5 enters a contracted state where the exhaust duct 2 is contracted in the Z-axis direction from the expanded state, and separates the suction port 2*a* of the exhaust duct 2 from the engine upper unit 102 together with the exhaust hood 4. In the case in which the expansion/contraction unit 5 is in the contracted state, as will be described later, the exhaust duct 2 and the exhaust hood 4 can move (retract) upward from the traveling track of the overhead crane provided above the engine room.

Further, the expansion/contraction unit 5 may retract the exhaust duct 2 upward from the traveling track of the overhead crane of the engine room in a state where the exhaust hood 4 remains on the engine upper unit 102 side of the marine internal combustion engine 101. At this time, the expansion/contraction unit 5 may contract in the separating direction to detachably separate the suction port 2*a* of the exhaust duct 2 from the exhaust hood 4 and separate the suction port 2*a* of the exhaust duct 2 from the engine upper unit 102. The exhaust hood 4 may be supported by a post (not shown) provided in the upper passage 109 of the engine upper unit 102.

Note that the expansion/contraction unit 5 as described above may be configured of, for example, a combination of a plurality of pipes capable of relatively moving in opposite directions along the central axis of the pipeline, or may be configured of a bellows-shaped pipe capable of expanding and contracting in the central-axis direction of the pipeline. Further, the expansion/contraction unit 5 may be expanded/contracted by the action of an actuator, or may be expanded/contracted by a manual operation such as turning a handle.

The shield 6 shields at least the cylinder 103 in the engine upper unit 102 of the marine internal combustion engine 101, and shields the engine upper unit 102 including the cylinder 103 in the first embodiment. In detail, as shown in FIGS. 1 and 2, the shield 6 is, for example, an openable and closable shield, and includes a plurality of curtains 7 and a storage unit 8 that stores the plurality of curtains 7 such that the plurality of curtains 7 can be taken in and out.

Each of the plurality of curtains 7 is made of a non-flammable or fire-resistant material. For example, as shown in FIGS. 1 and 2, the plurality of curtains 7 has a roll curtain shape, and is taken out from the storage unit 8 to shield the engine upper unit 102 (the inner region of the upper fence 110 shown in FIG. 3 in the first embodiment) from both sides in the X-axis direction and the Y-axis direction.

For example, as shown in FIGS. 1 and 2, the storage unit 8 is provided in the lower part (the outer wall surface of the opening 4*a* in FIGS. 1 and 2) of the exhaust hood 4. In the case in which the engine upper unit 102 is shielded inside the plurality of curtains 7, the storage unit 8 puts out the plurality of curtains 7 so as to hang down to the outside of the engine upper unit 102 (In FIGS. 1 and 2, the outer side of the upper fence 110 of the upper passage 109). In the case in which the shielding of the engine upper unit 102 by the plurality of curtains 7 is released, the storage unit 8 stores the plurality of curtains 7 by winding or the like.

Note that the plurality of curtains 7 is not limited to a roll curtain shape, and may be, for example, a shade curtain shape or a blind curtain shape. In the case in which the plurality of curtains 7 has a blind curtain shape, the shield 6 may shield or release the engine upper unit 102 by opening and closing the blade portions of the plurality of curtains 7. In this case, the shield 6 may not include the storage unit 8. Further, the plurality of curtains 7 may be opaque. However, the plurality of curtains 7 is preferably transparent or translucent from the viewpoint of easily visually recognizing the engine upper unit 102 shielded by the plurality of curtains 7 from the outside.

The floodlight unit 9 illuminates the engine upper unit 102 of the marine internal combustion engine 101. In detail, as shown in FIG. 2, the floodlight unit 9 is provided, for example, on the inner wall of the exhaust hood 4 (in the vicinity of the opening 4*a* in the first embodiment). Further, as shown in FIG. 4, the floodlight unit 9 is communicably connected to the controller 15, and operates based on control by the controller 15. The floodlight unit 9 projects light to the engine upper unit 102 which may be darkened by the shadow of the exhaust hood 4, and thus illuminates the engine upper unit 102.

The operation unit 10 is a device that performs each operation of the exhaust system 1. In detail, the operation unit 10 includes an input device such as a keyboard or a touch panel, and is communicably connected to the controller 15 as shown in FIG. 4. The operation unit 10 inputs an instruction signal that operates the exhaust system 1 to the controller 15 according to the input operation by an operator. Examples of the instruction signal by the operation unit 10 include an instruction signal that instructs the rotation operation of the suction fan 3, an instruction signal that instructs the expansion/contraction operation of the expansion/contraction unit 5, an instruction signal that instructs the insertion/removal operation of the shield 6, an instruction signal that instructs the light projection operation of the floodlight unit 9, and the like. Note that the operation unit 10 may be a stationary type installed at a predetermined position in the engine room, a portable type that can be carried by an operator, or a combination of these.

The detector 11 detects the fuel leakage gas sucked into the inside of the exhaust duct 2 by the suction fan 3. In detail, as shown in FIGS. 2 and 4, the detector 11 is provided at a predetermined site of the exhaust duct 2 (e.g., in the vicinity of the suction port 2*a*) and is communicably connected to the controller 15. For example, a sensor (not shown) of the detector 11 is located in the vicinity of the suction port 2*a* in exhaust duct 2. The sensor of the detector 11 is preferably disposed on the upstream side of the suction gas from the suction fan 3 provided in the middle of the exhaust duct 2.

For example, in the case in which the fuel leakage gas is included in the suction gas in the exhaust duct 2 (i.e., in the case in which the fuel leakage gas leaks from the marine internal combustion engine 101), the detector 11 detects the fuel leakage gas. In this case, the detector 11 transmits a detection signal indicating that the fuel leakage gas has been detected to the controller 15. On the other hand, in the case in which no fuel leakage gas is included in the suction gas in the exhaust duct 2 (i.e., in the case in which the fuel leakage gas is not leaked from the marine internal combustion engine 101), the detector 11 does not transmit the detection signal indicating that the fuel leakage gas has been detected to the controller 15.

Further, the detector 11 may detect the content of the fuel leakage gas in the suction gas in the exhaust duct 2. For example, in the case in which the suction gas in the exhaust duct 2 contains the fuel leakage gas, the detector 11 detects the content (>0) of the fuel leakage gas in the suction gas, and transmits a detection signal indicating the detected content of the fuel leakage gas to the controller 15. On the other hand, in the case in which the suction gas in the exhaust duct 2 contains no fuel leakage gas, the detector 11 detects the content (=0) of the fuel leakage gas in the suction gas, and transmits a detection signal indicating the detected content of the fuel leakage gas to the controller 15.

The notification unit 12 notifies the presence or absence of the fuel leakage gas in the suction gas sucked into the exhaust duct 2 (i.e., the presence or absence of the leakage of the fuel leakage gas). In detail, the notification unit 12 includes a light output unit (not shown) and the like, and is provided in the vicinity of the lower part of the exhaust hood 4 (the outer wall surface of the storage unit 8 of the shield 6 in FIG. 1) as shown in FIG. 1. Further, as shown in FIG. 4, the notification unit 12 is communicably connected to the controller 15.

The notification unit 12 notifies the presence or absence of the fuel leakage gas in the suction gas in the exhaust duct 2 by outputting visual information that is visually recognizable such as light based on the control signal from the controller 15. For example, the notification unit 12 outputs light of a predetermined color (red or the like) or a pattern to notify the presence of the fuel leakage gas. Further, the notification unit 12 notifies that there is no fuel leakage gas by outputting light of a color (green or the like) or a pattern different from the case in which there is the fuel leakage gas. Alternatively, the notification unit 12 may notify that there is no fuel leakage gas by not outputting light (turning off light).

Further, the notification unit 12 may notify the presence or absence of the fuel leakage gas in the suction gas in the exhaust duct 2 by outputting auditory information that is aurally recognizable such as sound based on the control signal from the controller 15. For example, the notification unit 12 notifies that there is the fuel leakage gas by outputting a sound having a predetermined frequency or pattern, and notifies that there is no fuel leakage gas by outputting a sound having a frequency or pattern different from the above. Alternatively, the notification unit 12 may notify that there is no fuel leakage gas by outputting no sound.

Note that the installation position of the notification unit 12 is not limited to the outer wall surface of the storage unit 8 shown in FIG. 1, and may be a desired position in the exhaust system 1, such as the outer wall surface of the exhaust duct 2 or the outer wall surface of the exhaust hood 4. Alternatively, the installation position may be a desired position in the marine internal combustion engine 101, such as the upper passage 109 and the upper fence 110 of the engine upper unit 102, or may be a desired position in the engine room. Further, the notification unit 12 may notify the presence or absence of the fuel leakage gas in the suction gas by outputting a combination of the visual information and the auditory information described above.

Further, the notification unit 12 may notify the presence or absence of the fuel leakage gas in the suction gas in the exhaust duct 2 in conjunction with a safety monitoring device (not shown). The safety monitoring device monitors the operation state of devices such as the marine internal combustion engine 101, an auxiliary machine such as a generator, and a water generator in the engine room, and outputs an alarm that notifies the occurrence of a failure in the operation state in the case in which a failure occurs in the operation state. For example, the notification unit 12 is communicably connected to the safety monitoring device, and in the case in which the fuel leakage gas is contained in the suction gas in the exhaust duct 2 (leakage of the fuel leakage gas occurs), notifies the safety monitoring device of the presence of the fuel leakage gas, and causes the safety monitoring device to output an alarm. The notification unit 12 can notify the presence of the fuel leakage gas by the alarm.

The sprinkler 13 is a device that cleans and reduces a large amount of the fuel leakage gas leaked from the marine internal combustion engine 101. In detail, as shown in FIG. 2, the sprinkler 13 is provided, for example, on the inner wall (the upper part of the inner wall in the first embodiment) of the exhaust hood 4. Further, as shown in FIG. 4, sprinkler 13 is communicably connected to the controller 15, and operates based on control by the controller 15. The sprinkler 13 sprays water to at least the engine upper unit 102 of the marine internal combustion engine 101, and thus the fuel leakage gas leaking in a large amount to the engine upper unit 102 is cleaned (scrubbed) with water. In this manner, the sprinkler 13 reduces the amount of the fuel leakage gas in the engine upper unit 102. Note that the reduction of the fuel leakage gas by the water spray of the sprinkler 13 is specifically effective in the case in which the fuel leakage gas is an ammonia gas volatilized from an ammonia fuel. This is because the ammonia gas becomes ammonia water by washing with water.

The controller 15 controls the operation of the exhaust system 1. In detail, as shown in FIG. 4, the controller 15 receives an instruction signal from the operation unit 10, and controls each operation of the suction fan 3, the expansion/contraction unit 5, the shield 6, and the floodlight unit 9 described above based on the received instruction signal. For example, the controller 15 starts or stops the rotation operation of the suction fan 3. Further, the controller 15 extends or contracts the expansion/contraction unit 5 to take in and out the plurality of curtains 7 of the shield 6 from the storage part 8. Alternatively, the controller 15 starts or stops the light projection of the floodlight unit 9.

The controller 15 also controls the operations of the notification unit 12 and the sprinkler 13 based on a detection signal from the detector 11. For example, in the case in which the fuel leakage gas is detected by the detector 11, the controller 15 receives the detection signal from the detector 11, and controls the notification unit 12 to notify that there is the fuel leakage gas based on the received detection signal. On the other hand, in the case in which no fuel leakage gas is detected by the detector 11, the controller 15 does not receive the detection signal from the detector 11, and controls the notification unit 12 to notify that there is no fuel leakage gas based on the detection signal. In the case in which the detector 11 detects the content of the fuel leakage gas contained in the suction gas in the exhaust duct 2, the controller 15 receives the detection signal from the detector 11 and acquires the content of the fuel leakage gas based on the received detection signal. The controller 15 compares a preset threshold with the content of the fuel leakage gas, and controls the sprinkler 13 to spray water in the case in which the content of the fuel leakage gas exceeds the threshold.

Note that the controller 15 may determine the presence or absence of the fuel leakage gas in the suction gas in the exhaust duct 2 based on the content of the fuel leakage gas acquired as described above. At this time, when the content of the fuel leakage gas exceeds a predetermined value (e.g., the content>0), the controller 15 controls the notification unit 12 to notify that there is the fuel leakage gas, and when the content of the fuel leakage gas is equal to or less than the predetermined value (e.g., the content=0), the controller controls the notification unit 12 to notify that there is no fuel leakage gas.

Further, the controller 15 may control the rotation operation of the suction fan 3 based on the detection signal from the detector 11. For example, in the case in which no fuel leakage gas is detected by the detector 11, the controller 15 determines that there is no fuel leakage gas in the suction gas in the exhaust duct 2 based on the fact that the detection signal is not received from the detector 11. In this case, the controller 15 controls the suction fan 3 so as to stop the rotational operation. On the other hand, in the case in which the fuel leakage gas is detected by the detector 11, the controller 15 determines that the fuel leakage gas is present in the suction gas in the exhaust duct 2 based on the detection signal received from the detector 11. In this case, the controller 15 controls the suction fan 3 to start the rotational operation. Further, the controller 15 may acquire the content of the fuel leakage gas based on the detection signal received from the detector 11, and control the rotation speed of the suction fan 3 according to the acquired content. For example, the controller 15 controls the suction fan 3 to increase the rotation speed in the case in which the acquired content of the fuel leakage gas increases along the time series, and controls the suction fan 3 to decrease the rotation speed in the case in which the acquired content of the fuel leakage gas decreases along the time series. Since the rotational operation or the rotational speed of the suction fan 3 is controlled by the controller 15 as described above, the power consumption of the suction fan 3 can be reduced as compared with the case in which the suction fan 3 is always operated to rotate.

On the other hand, the marine internal combustion engine 101 is a two-stroke internal combustion engine exemplified by a uniflow-scavenging exhaust type crosshead diesel engine or the like, and operates by, for example, performing mix-combusting of an ignition fuel and an alternative fuel. As shown in FIGS. 1 to 3, the marine internal combustion engine 101 of this type includes the cylinder 103, a fuel injection valve **103*a*, the first fuel pump 104 for an ignition fuel, the second fuel pump 105 for an alternative fuel, the exhaust manifold 106, and the supercharger 107 in the engine upper unit 102. Further, the marine internal combustion engine 101 includes an EGR device 108, the upper passage 109 and the upper fence 110, a lower passage 111 and a lower fence 112, a frame 113, and a base plate 114. In the first embodiment, the marine internal combustion engine 101 of the type including the EGR device 108 is shown. However, the marine internal combustion engine 101 is not limited to this, and may be of a type not including the EGR device 108**.

The cylinder 103 is a cylindrical structure (cylinder) forming a combustion chamber in its inside, and a plurality of (e.g., six) cylinders is provided in the engine upper unit 102. In the inside of the plurality of cylinders 103, a piston (not shown) is housed being reciprocatable in a piston-axial direction (Z-axis direction in FIGS. 1 to 3). The fuel injection valve **103*a* injects an ignition fuel, an alternative fuel, and the like into the combustion chamber of the cylinder 103, and is provided in each of the plurality of cylinders 103. The first fuel pump 104 is a pump that pumps an ignition fuel to the fuel injection valve 103*a* through a pipe. The second fuel pump 105 is a pump that pumps an alternative fuel to the fuel injection valve 103*a* through a pipe. The first fuel pump 104 and the second fuel pump 105 are provided in the engine upper unit 102 as many as necessary (e.g., six each) according to the number of disposed cylinders 103**.

The exhaust manifold 106 receives an exhaust gas from the combustion chamber of the cylinder 103 through a pipe and temporarily stores the exhaust gas. For example, as shown in FIG. 3, the exhaust manifold is provided in the engine upper unit 102 so as to be positioned between the plurality of cylinders 103 and the supercharger 107. As shown in FIG. 3, the supercharger 107 includes an intake part **107*a* that sucks air (fresh air) as a combustion gas from the outside, and is provided in the engine upper unit 102 in a state of communicating with the exhaust manifold 106 through a pipe. The supercharger 107 compresses a combustion gas such as air sucked from the intake part 107***a* using an exhaust gas sent from the exhaust manifold 106. In the case in which the marine internal combustion engine 101 is an internal combustion engine (EGR engine) of a type including the EGR device 108, the EGR device 108 is a device that reduces nitrogen oxides in the exhaust gas by exhaust gas recirculation (EGR), and is connected to the supercharger 107 and the like through a pipe. For example, the EGR device 108 is provided in a region from the engine upper unit 102 to the frame 113 of the marine internal combustion engine 101.

As shown in FIGS. 1 and 2, the frame 113 is provided on the base plate 114 and is located below the cylinder 103. Inside the frame 113, a crosshead (not shown) and the like that reciprocate with a piston in the cylinder 103 are provided. The base plate 114 constitutes a crankcase that houses a crankshaft (not shown) and the like of the marine internal combustion engine 101, and is disposed below the frame 113 (above the floor 121 of the engine room) as shown in FIGS. 1 and 2.

Further, as shown in FIGS. 1 and 2, the marine internal combustion engine 101 includes the upper passage 109 provided along the engine upper unit 102 and the upper fence 110 that checks falling from the upper passage 109 and the like. The upper passage 109 is a passage that allows an operator to enter the position of the engine upper unit 102, and is formed in, for example, an annular shape surrounding the engine upper unit 102. The upper fence 110 is erected along the outer edge of the annular upper passage 109. As shown in FIG. 3, the upper fence 110 surrounds the device such as the cylinder 103 and the upper passage 109 provided in the engine upper unit 102 in a plan view as viewed from the upper side in the Z-axis direction.

Furthermore, as shown in FIGS. 1 and 2, the marine internal combustion engine 101 includes the lower passage 111 provided along the frame 113 and the lower fence 112 that checks falling from the lower passage 111 and the like. The lower passage 111 has a staircase (not shown) leading to the upper passage 109 described above, and is a passage that allows an operator to move back and forth between the position of the frame structure 113 and the position of the engine upper unit 102. The lower fence 112 is erected along the outer edge of the lower passage 111.

Next, the retraction of the exhaust system 1 from the overhead crane in the engine room will be described. As shown in FIGS. 1 and 2, the exhaust system 1 includes the expansion/contraction unit 5 that enables the exhaust duct 2 to expand and contract in the Z-axis direction. The exhaust system 1 can retract from the overhead crane in the engine room by contracting the expansion/contraction unit 5 or the like.

Figure 5:
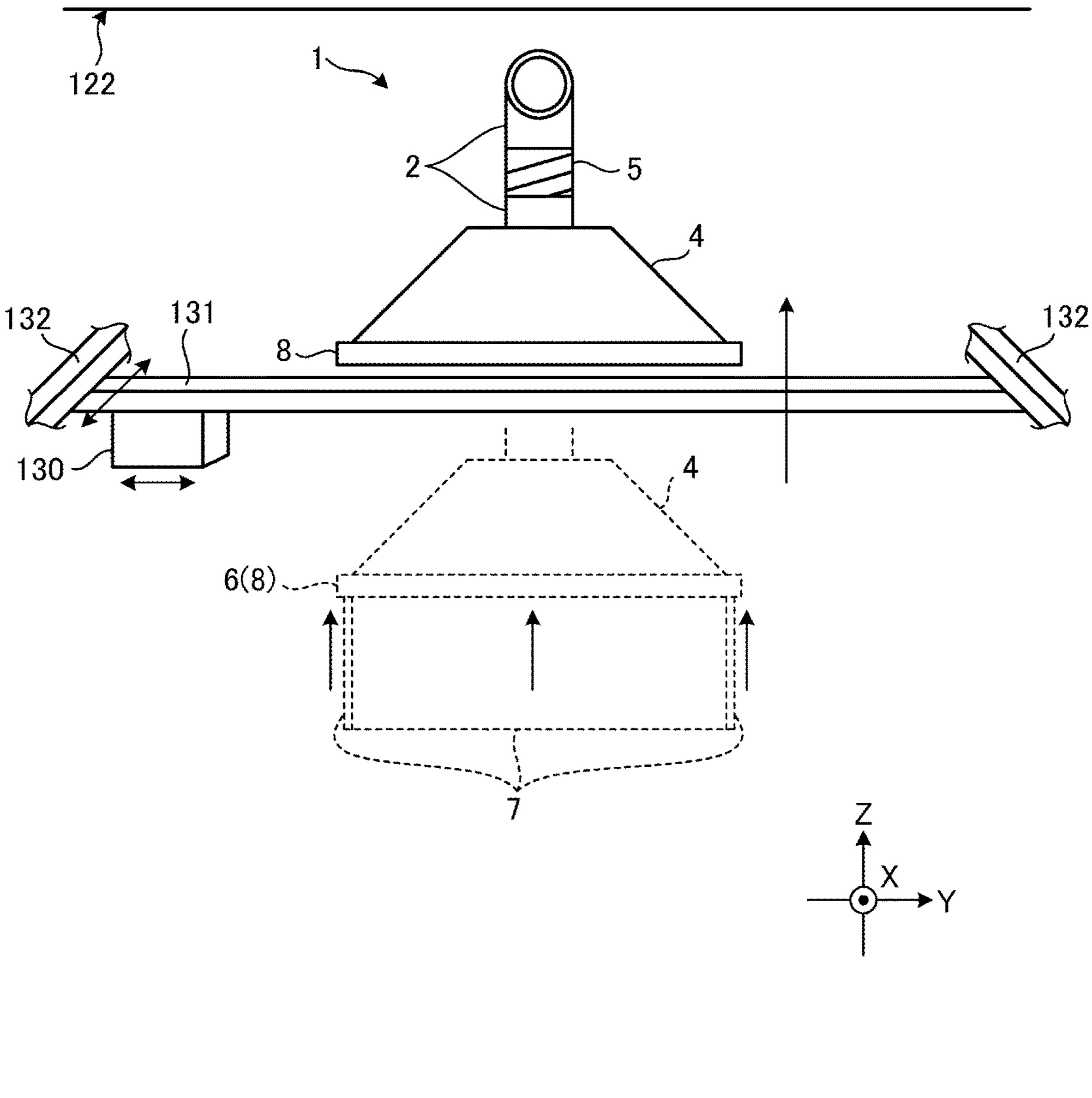
FIG. 5 is a schematic diagram showing an example of a method in which the exhaust system according to the first embodiment of the present disclosure retracts from an overhead crane in an engine room.

FIG. 5 is a schematic diagram showing an example of a method in which the exhaust system according to the first embodiment of the present disclosure retracts from the overhead crane in the engine room. As shown in FIG. 5, an overhead crane 130, and a first rail 131 and a pair of second rails 132 that enable the overhead crane 130 to travel along the ceiling 122 of the engine room are provided in the engine room. The first rail 131 is a rail that allows the overhead crane 130 to travel in a first direction (e.g., the Y-axis direction) in the engine room, and is provided in an upper part in the engine room. The overhead crane 130 is provided on the first rail 131 and can travel along the first rail 131. The pair of second rails 132 is a rail that allows the overhead crane 130 to travel in a second direction (e.g., the X-axis direction) in the engine room, and is provided in an upper part in the engine room so as to be separated by a predetermined distance in the long-side direction of the first rail 131. As shown in FIG. 5, both ends of the first rail 131 in the long-side direction are attached to the pair of second rails 132. The first rail 131 can move together with the overhead crane 130 along the pair of second rails 132. That is, the overhead crane 130 can travel in the long-side direction of the first rail 131 and the long-side direction of the pair of second rails 132.

The exhaust system 1 extends the expansion/contraction unit 5 in the Z-axis direction to cause the suction port 2*a* of the exhaust duct 2 and the exhaust hood 4 to approach the engine upper unit 102 of the marine internal combustion engine 101 across the traveling track of the overhead crane 130 (the state shown in FIGS. 1 and 2). In this state, the exhaust system 1 sucks a gas from the engine upper unit 102 side into the inside of the exhaust duct 2.

Here, in the case in which the overhead crane 130 travels in the long-side direction of the first rail 131 and the long-side direction of the pair of second rails 132, the exhaust system 1 retracts the exhaust duct 2 and the exhaust hood 4 from the traveling track of the overhead crane 130 by contracting the expansion/contraction unit 5 in the Z-axis direction from the above state.

In detail, as shown in FIG. 5, due to the contraction of the expansion/contraction unit 5, the exhaust duct 2 contracts so as to move from a state of crossing the traveling track of the overhead crane 130 to the upper side of the traveling track. Accordingly, the exhaust hood 4 moves from the lower side to the upper side of the traveling track of the overhead crane 130. Further, as shown in FIG. 5, the plurality of curtains 7 of the shield 6 is housed in the storage unit 8. Note that any one of the contraction operation of the expansion/contraction unit 5 and the storage operation of the plurality of curtains 7 may be performed first, or may be performed in parallel. As a result, the exhaust duct 2, the exhaust hood 4, and the storage unit 8 (in a state where the plurality of curtains 7 is stored) are accommodated between the ceiling 122 of the engine room and the first rail 131 and the pair of second rails 132 as shown in FIG. 5. As described above, the exhaust system 1 retracts above the traveling track of the overhead crane 130, and as a result, the exhaust system 1 avoids contact with the overhead crane 130.

Figure 6:
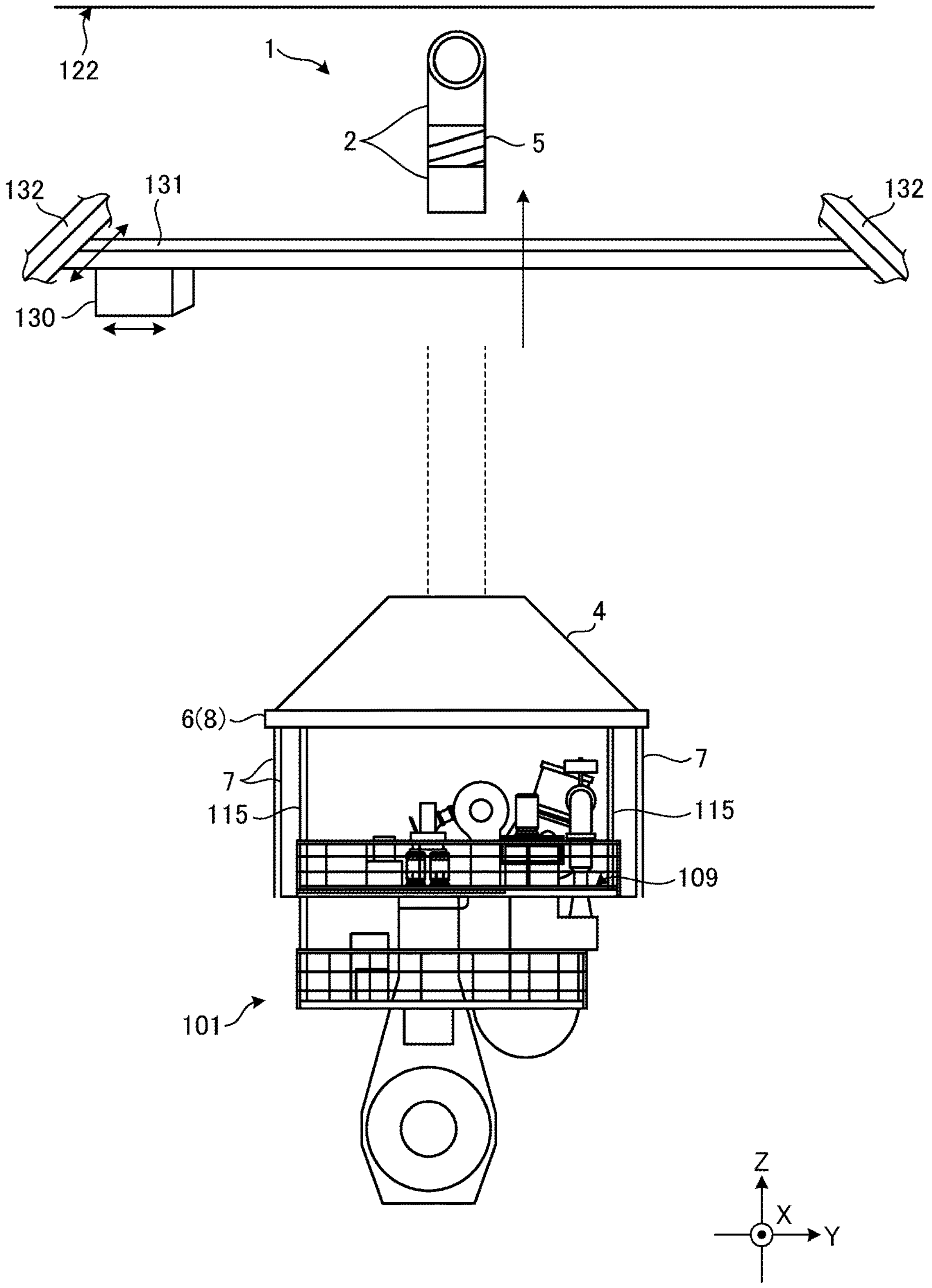
FIG. 6 is a schematic diagram showing a modification of a method in which the exhaust system according to the first embodiment of the present disclosure retracts from the overhead crane in the engine room.

Further, the exhaust system 1 may retract the exhaust duct 2 from the traveling track of the overhead crane 130 without retracting the exhaust hood 4. FIG. 6 is a schematic diagram showing a modification of a method in which the exhaust system according to the first embodiment of the present disclosure retracts from the overhead crane in the engine room. In this modification, the exhaust duct 2 is detachably connected to the exhaust hood 4. Specifically, with the contraction operation of the expansion/contraction unit 5, the exhaust duct 2 is separated from the exhaust hood 4 to separate the suction port 2*a* upward (toward the ceiling 122 of the engine room) from the exhaust hood 4. Further, with the extension operation of the expansion/contraction unit 5, the exhaust duct 2 approaches the exhaust hood 4 across the traveling track of the overhead crane 130, and connects the suction port 2*a* to the exhaust hood 4 (the state shown in FIGS. 1 and 2). Further, as shown in FIG. 6, the exhaust hood 4 is supported by a plurality of posts 115 erected on the upper passage 109 of the marine internal combustion engine 101.

As shown in FIGS. 1 and 2, the exhaust system 1 sucks a gas from the engine upper unit 102 side into the inside of the exhaust duct 2 in a state where the exhaust duct 2 and the exhaust hood 4 are connected. Here, in the case in which the overhead crane 130 travels in the long-side direction of the first rail 131 and the long-side direction of the pair of second rails 132, the exhaust system 1 retracts the exhaust duct 2 from the traveling track of the overhead crane 130 by contracting the expansion/contraction unit 5 in the Z-axis direction from the above state.

In detail, as shown in FIG. 6, the exhaust duct 2 is separated from the exhaust hood 4 by contraction of the expansion/contraction unit 5, and moves from a state of crossing the traveling track of the overhead crane 130 to the upper side of the traveling track. As a result, as shown in FIG. 6, the exhaust duct 2 is accommodated between the ceiling 122 of the engine room and the first rail 131 and the pair of second rails 132. On the other hand, as shown in FIG. 6, the position of the exhaust hood 4 does not change before and after being separated from the exhaust duct 2, and the exhaust hood 4 is positioned between the traveling track of the overhead crane 130 and the marine internal combustion engine 101 in a state of being supported by the plurality of posts 115. That is, the exhaust hood 4 maintains the state of being positioned below the traveling track, and does not hinder the traveling of the overhead crane 130. Further, as shown in FIG. 6, the shield 6 maintains a state where the plurality of curtains 7 is not stored and is taken out. As described above, the exhaust system 1 retracts the exhaust duct 2 above the traveling track of the overhead crane 130 while leaving the exhaust hood 4 below the traveling track of the overhead crane 130, and as a result, it is possible to avoid contact with the overhead crane 130.

As described above, the exhaust system 1 according to the first embodiment of the present disclosure includes the exhaust duct 2 provided above the marine internal combustion engine 101 installed in the engine room of the ship, and the suction fan 3 that sucks the fuel leakage gas leaked from the marine internal combustion engine 101 from the engine upper unit 102 side of the marine internal combustion engine 101 into the inside of the exhaust duct 2. In the exhaust system 1, the exhaust duct 2 exhausts the fuel leakage gas sucked by the suction fan 3 to the outside of the engine room. Therefore, even though the fuel leakage gas leaks from the marine internal combustion engine 101 unintentionally due to damage to the piping of the marine internal combustion engine 101 or unavoidably due to the maintenance of the device such as the cylinder 103 in the engine upper unit 102, the fuel leakage gas can be sucked into the inside of the exhaust duct 2 before the fuel leakage gas diffuses from the marine internal combustion engine 101 into the engine room (specifically, the area such as the passage through which the operator passes). As a result, the leaked gas (fuel leakage gas) from the marine internal combustion engine can be sufficiently exhausted without being diffused into the engine room.

Further, the exhaust system 1 according to the first embodiment of the present disclosure further includes the exhaust hood 4 that opens larger than the exhaust duct 2 and communicates the engine upper unit 102 side with the inside of the exhaust duct 2, and the exhaust hood 4 covers at least the upper side of the cylinder 103. Specifically, the marine internal combustion engine 101 includes the upper passage 109 provided along the engine upper unit 102 and the upper fence 110 erected along the outer edge of the upper passage 109, and the exhaust hood 4 covers the upper side of the inner region surrounded by the upper fence 110. Therefore, the fuel leakage gas sucked into the exhaust hood 4 from the engine upper unit 102 side by the suction fan 3 can be concentrated to the suction port 2*a* of the exhaust duct 2 without leakage. As a result, it is possible to efficiently exhaust the fuel leakage gas from the marine internal combustion engine into the engine room without diffusing the fuel leakage gas.

Further, in the exhaust system 1 according to the first embodiment of the present disclosure, the expansion/contraction unit 5 that extends in the approaching direction toward the engine upper unit 102 and contracts in the separating direction away from the engine upper unit 102 is provided in the exhaust duct 2. Therefore, with the expansion and contraction of the expansion/contraction unit 5, the exhaust duct 2 can be expanded in the approaching direction or contracted in the separating direction, and thus the exhaust system 1 (e.g., the exhaust duct 2, the exhaust hood 4, and the like) can be retracted from the traveling track of the overhead crane 130 in the engine room. As a result, it is possible to check contact between the overhead crane 130 and the exhaust system 1.

Further, the exhaust system 1 according to the first embodiment of the present disclosure further includes the shield 6 that shields at least the cylinder 103 (e.g., the inner region of the upper fence 110) of the engine upper unit 102. Therefore, it is possible to block the flow of the fuel leakage gas that tries to leak out from the engine upper unit 102 to the outside of the marine internal combustion engine 101, and thus it is possible to easily check the diffusion of the fuel leakage gas in the engine room.

Further, in the exhaust system 1 according to the first embodiment of the present disclosure, the detector 11 detects the fuel leakage gas sucked into the inside of the exhaust duct 2 by the suction fan 3, and the controller 15 controls the notification unit 12 to notify that the fuel leakage gas is present in the case in which the fuel leakage gas is detected, and controls the notification unit 12 to notify that the fuel leakage gas is not present in the case in which no fuel leakage gas is detected. Therefore, the presence or absence of the leakage of the fuel leakage gas can be easily confirmed from the outside of the marine internal combustion engine 101, and the confirmation result can be used to determine whether to enter the upper passage 109 of the engine upper unit 102 for the purpose of maintenance or the like of the marine internal combustion engine 101.

Further, the exhaust system 1 according to the first embodiment of the present disclosure further includes the sprinkler 13 that sprays water on at least the engine upper unit 102 of the marine internal combustion engine 101, the detector 11 detects the content of the fuel leakage gas contained in the suction gas in the exhaust duct 2, and the controller 15 controls the sprinkler 13 to sprinkle water in the case in which the detected content of the fuel leakage gas exceeds a predetermined threshold value. Therefore, a large amount of the fuel leakage gas leaked to the engine upper unit 102 can be cleaned by spraying water, and thus it is possible to reduce the amount of the fuel leakage gas.

Further, the exhaust system 1 according to the first embodiment of the present disclosure further includes the floodlight unit 9 that illuminates the engine upper unit 102. Therefore, it is possible to brighten the engine upper unit 102, such as the exhaust duct 2 and the exhaust hood 4, which is darkened by the shadow of the exhaust system 1, and thus it is possible to easily perform maintenance work or the like on the engine upper unit 102.

Second Embodiment

Figure 7:
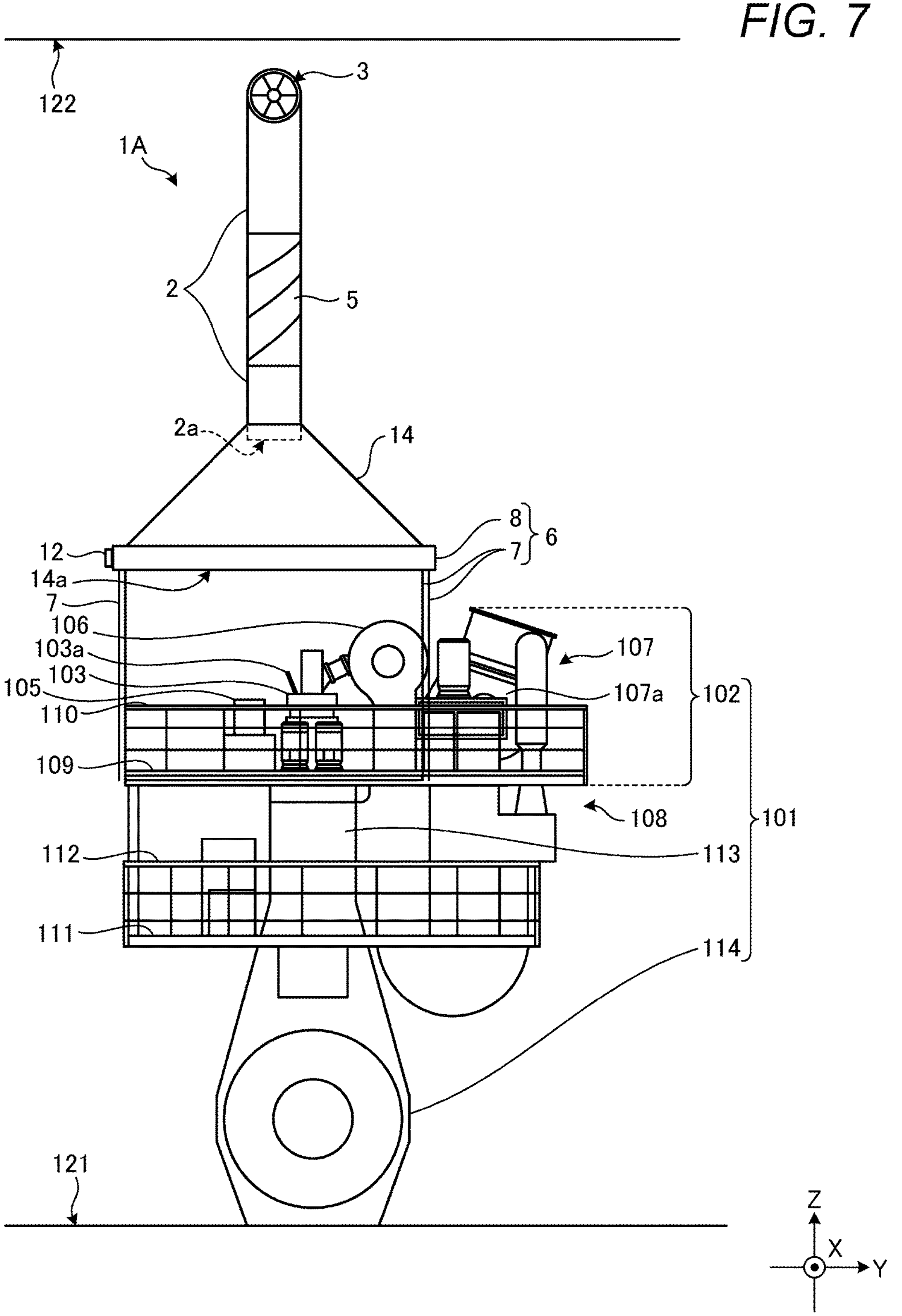
FIG. 7 is a diagram showing a configuration example of an exhaust system according to a second embodiment of the present disclosure.
Figure 8:
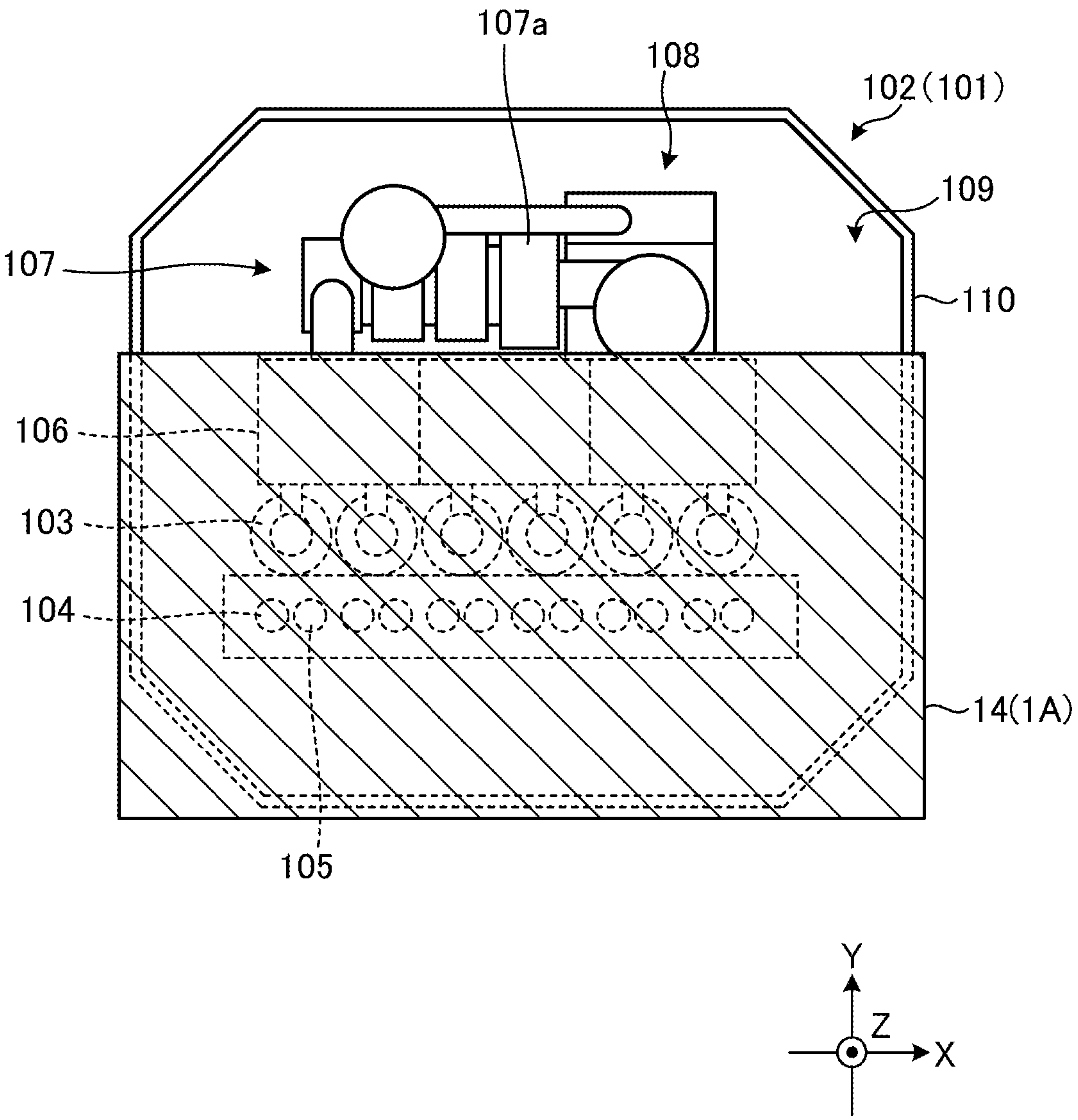
FIG. 8 is a diagram showing an example of a state where an engine upper unit of a marine internal combustion engine is covered by the exhaust system shown in FIG. 7.

Next, an exhaust system according to a second embodiment of the present disclosure will be described. FIG. 7 is a diagram showing a configuration example of an exhaust system according to the second embodiment of the present disclosure. FIG. 7 is a schematic diagram of an exhaust system 1A as viewed from the X-axis direction. FIG. 8 is a diagram showing an example of a state where the engine upper unit of a marine internal combustion engine is covered by the exhaust system shown in FIG. 7. As shown in FIGS. 7 and 8, the exhaust system 1A according to the second embodiment includes an exhaust hood 14 instead of the exhaust hood 4 of the exhaust system 1 according to the foregoing first embodiment. Other configurations are the same as those of the first embodiment, and the same components are denoted by the same reference numerals.

The exhaust hood 14 is an example of a hood that easily sucks the fuel leakage gas from a marine internal combustion engine 101 into the inside of an exhaust duct 2. In detail, as shown in FIG. 7, the exhaust hood 14 has an opening 14*a* that opens from the exhaust duct 2 toward an engine upper unit 102 larger than the exhaust duct 2, and communicates the engine upper unit 102 side with the inside of the exhaust duct 2. The opening 14*a* of the exhaust hood 14 is larger than a suction port 2*a* of the exhaust duct 2 and smaller than an opening 4*a* of the exhaust hood 4 in the foregoing first embodiment. As shown in FIG. 7, the exhaust hood 14 covers the upper side of a region of the engine upper unit 102 facing the opening 14*a* with the opening 14*a* facing the engine upper unit 102 side. That is, a region above the engine upper unit 102 covered by the exhaust hood 14 is narrower than the exhaust hood 4 of the foregoing first embodiment. Note that the configuration of the exhaust hood 14 is similar to that of the exhaust hood 4 of the first embodiment except that the region covering the engine upper unit 102 is narrower than that of the exhaust hood 4.

For example, as shown in FIGS. 7 and 8, the exhaust hood 14 covers the upper side of a region (in the following, referred to as an inner specific region) excluding a supercharger 107 in an inner region surrounded by an upper fence 110 of the engine upper unit 102. In the second embodiment, for example, as shown in FIG. 8, the inner specific region of the engine upper unit 102 is a region on the negative side in the Y-axis direction from the supercharger 107 in the inner region surrounded by the upper fence 110. Specifically, the inner specific region of the engine upper unit 102 includes a plurality of cylinders 103, a plurality of fuel injection valves 103*a*, a plurality of first fuel pumps 104, and a plurality of second fuel pumps 105. Further, the inner specific region of the engine upper unit 102 includes an exhaust manifold 106 and a portion of the upper passage 109 and the upper fence 110 on the negative side in the Y-axis direction with respect to the supercharger 107. As shown in FIG. 7, the exhaust hood 14 causes the opening 14*a* to face the inner specific region of the engine upper unit 102, and covers the upper side of the inner specific region as shown by hatching in FIG. 8. The exhaust hood 14 receives the suction gas by a suction fan 3 from the inner specific region through the opening 14 *a*, and concentrates the received suction gas on the suction port 2*a* of the exhaust duct 2 without leaking out of the exhaust hood 14.

Note that the exhaust hood 14 may cover solely the upper side of the inner specific region described above, or may cover the upper side of the inner specific region together with the upper side of a partial region outside the upper fence 110 as exemplified by hatching in FIG. 8. Specifically, the exhaust hood 14 preferably covers the upper side of the inner specific region from directly above the marine internal combustion engine 101.

Further, in the second embodiment, a shield 6 is similar to that of the foregoing first embodiment except that the shield 6 shields the inner specific region of the engine upper unit 102 in the inner region of the upper fence 110. For example, as shown in FIG. 7, the shield 6 takes out the curtain on the positive side in the Y-axis direction among the plurality of curtains 7 so as to hang down between the exhaust manifold 106 and the supercharger 107. Further, each width (length in the X-axis direction or the Y-axis direction in FIG. 7) of the plurality of curtains 7 may be set in accordance with the dimensions of the opening 14*a* of exhaust hood 14.

As described above, in the exhaust system 1A according to the second embodiment of the present disclosure, the exhaust hood 14 covers the upper side of the region (inner specific region) excluding the supercharger 107 in the inner region surrounded by the upper fence 110 of the engine upper unit 102, and the rest is similar to the first embodiment. Therefore, the benefit of the same operation and effect as those of the foregoing first embodiment can be obtained, and the intake of the fresh air by the intake part 107*a* of the supercharger 107 can be made difficult to be inhibited by the gas suction action by the suction fan 3, whereby the fuel leakage gas can be sucked into the exhaust duct 2 without impairing the performance of the supercharger 107.

Further, in the exhaust system 1A according to the second embodiment of the present disclosure, the inner specific region of the engine upper unit 102 described above is shielded by the shield 6. Therefore, a region where gas is sucked by the suction fan 3 and a region where fresh air is sucked by an intake part 107*a* of the supercharger 107 can be separated by the shield 6 (specifically, the curtain 7). As a result, at the time of sucking the gas by the suction fan 3, the suction of the fresh air by the intake part 107*a* can be much more easily performed.

Third Embodiment

Figure 9:
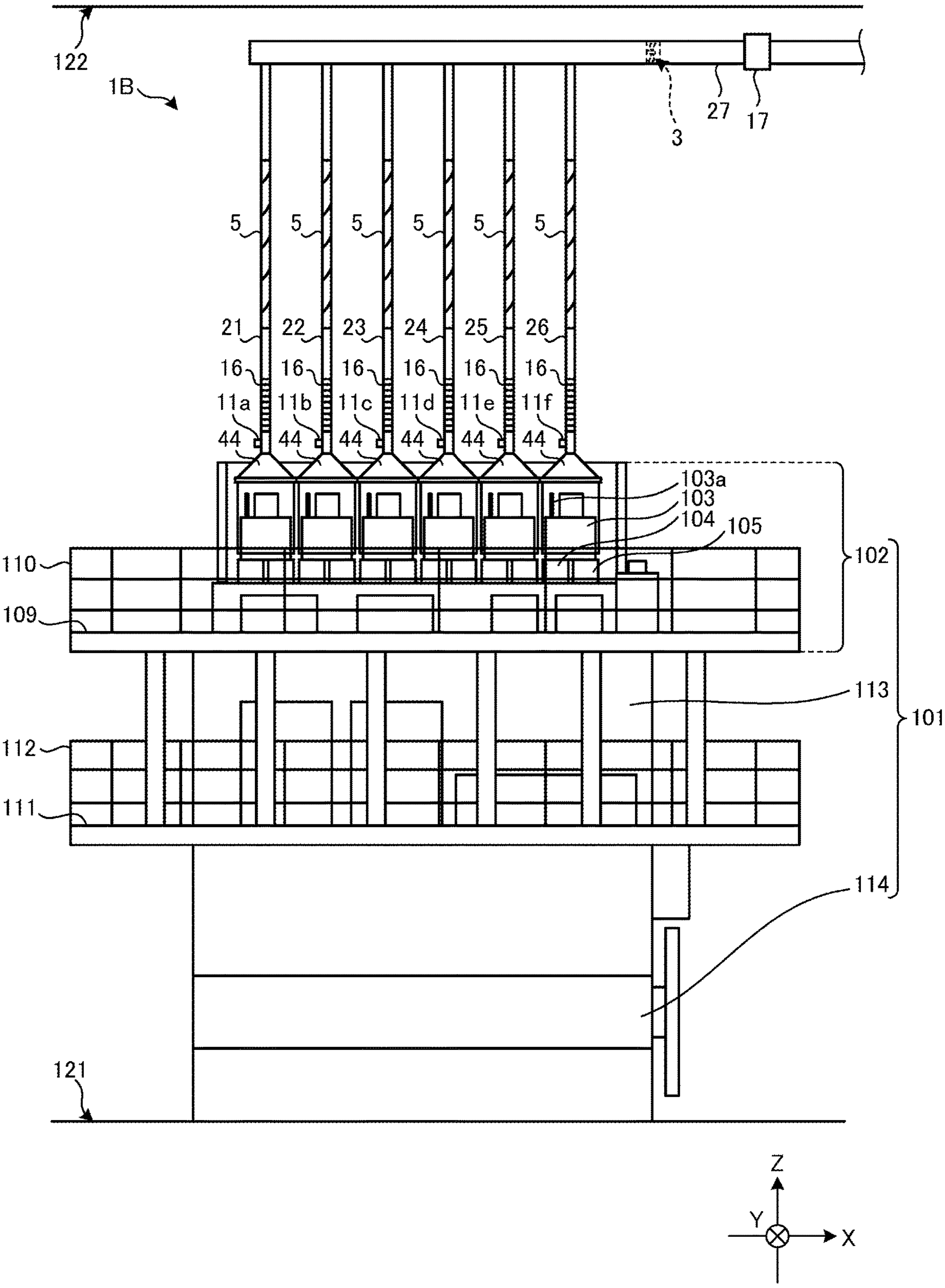
FIG. 9 is a diagram showing a configuration example of an exhaust system according to a third embodiment of the present disclosure.
Figure 10:
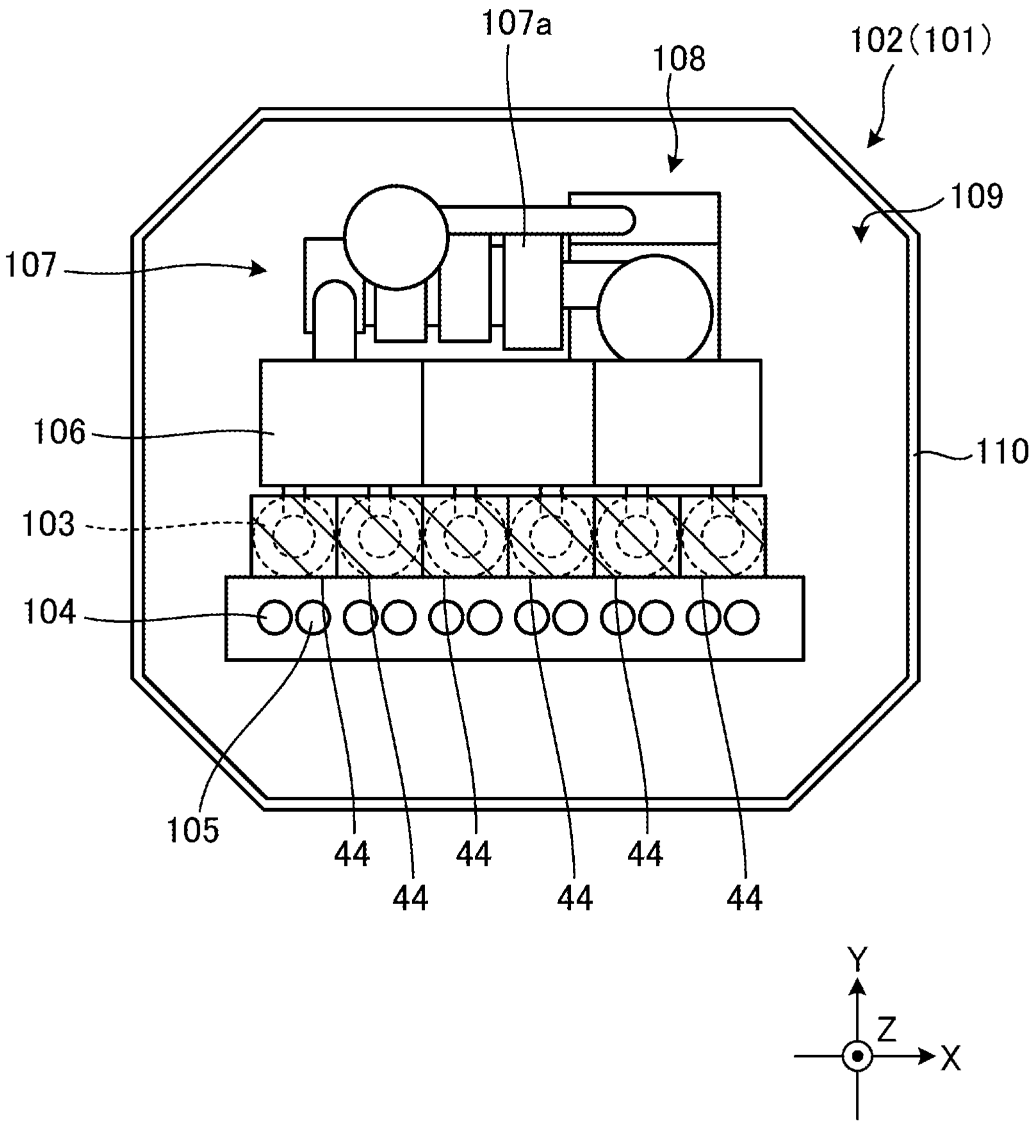
FIG. 10 is a diagram showing an example of a state where an engine upper unit of a marine internal combustion engine is covered by the exhaust system shown in FIG. 9.
Figure 11:
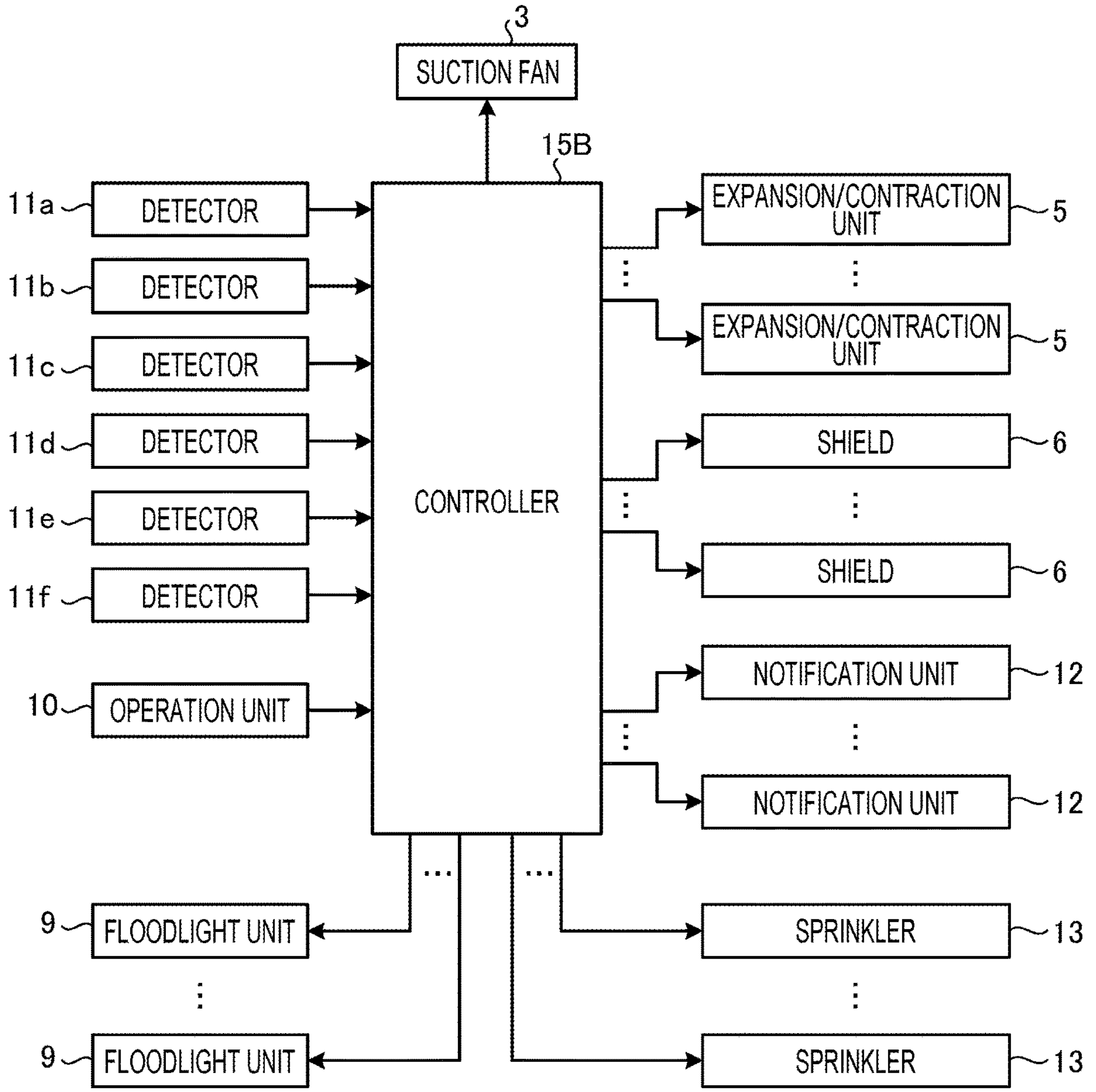
FIG. 11 is a block diagram showing an example of a drive configuration of the exhaust system according to the third embodiment of the present disclosure.
Figure 12:
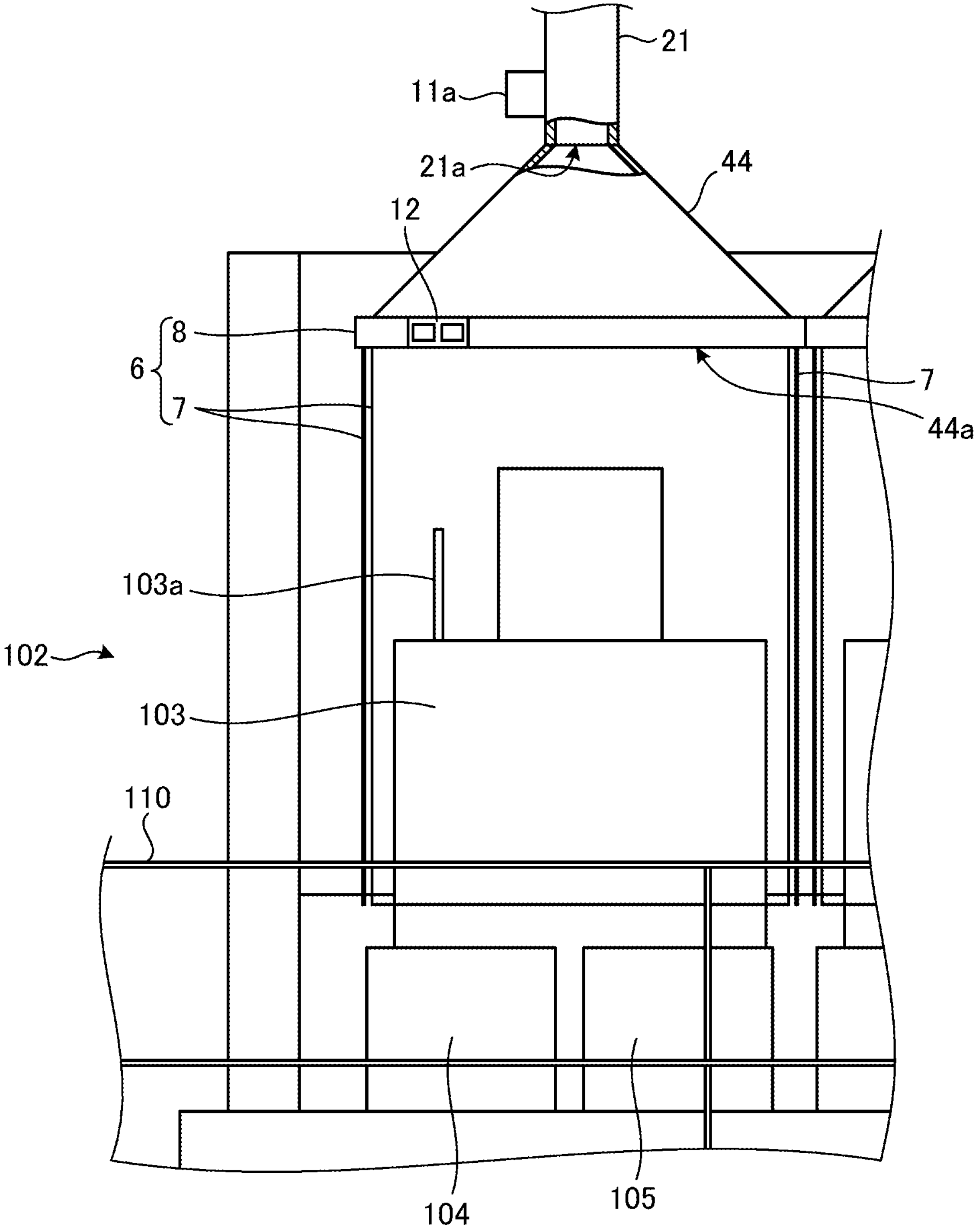
FIG. 12 is a diagram showing a configuration example of the vicinity of a suction port of the exhaust system according to the third embodiment of the present disclosure.

Next, an exhaust system according to a third embodiment of the present disclosure will be described. FIG. 9 is a diagram showing a configuration example of an exhaust system according to the third embodiment of the present disclosure. FIG. 9 is a schematic diagram of an exhaust system 1B as viewed from the Y-axis direction. FIG. 10 is a diagram showing an example of a state where the engine upper unit of a marine internal combustion engine is covered by the exhaust system shown in FIG. 9. FIG. 11 is a block diagram showing an example of a drive configuration of the exhaust system according to the third embodiment of the present disclosure. FIG. 12 is a diagram showing a configuration example of the vicinity of a suction port of the exhaust system according to the third embodiment of the present disclosure.

As shown in FIGS. 9 to 12, the exhaust system 1B according to the third embodiment includes a plurality of exhaust ducts 21 to 26 corresponding to a plurality of cylinders 103 and an exhaust duct 27 in which the plurality of exhaust ducts 21 to 26 merge, instead of the exhaust duct 2 of the exhaust system 1 according to the foregoing first embodiment. A suction fan 3 and a shutoff valve 17 are provided in the exhaust duct 27. Further, the exhaust system 1B includes a plurality of exhaust hoods 44 corresponding to the plurality of cylinders 103 instead of the exhaust hood 4, a plurality of detectors 11*a* to 11*f* corresponding to the plurality of exhaust ducts 21 to 26 instead of the detector 11, and a controller 15B instead of the controller 15. Further, the exhaust system 1B includes a plurality of expansion/contraction units 5, a plurality of shields 6, a plurality of floodlight units 9, a plurality of notification units 12, a plurality of sprinklers 13, and a plurality of deformable units 16 corresponding to the plurality of exhaust ducts 21 to 26. Other configurations are the same as those of the first embodiment, and the same components are denoted by the same reference numerals.

Each of the plurality of exhaust ducts 21 to 26 is an example of a pipeline that guides a fuel leakage gas leaked from a marine internal combustion engine 101 installed in the engine room of the ship to the outside of the engine room. In detail, as shown in FIG. 9, each of the plurality of exhaust ducts 21 to 26 is provided so as to open from above the marine internal combustion engine 101 toward the plurality of cylinders 103. For example, as shown in FIG. 12, the suction port 21*a* of the exhaust duct 21 is an opening that receives the suction gas by the suction fan 3, and opens toward one cylinder 103 among the plurality of cylinders 103. From the viewpoint of further shortening the suction path of the fuel leakage gas from the cylinder 103 to the exhaust duct 21, the suction port 21*a* of the exhaust duct 21 is preferably positioned directly above the cylinder 103. Here, the position directly above the cylinder 103 is a position in a virtual projection plane obtained by projecting the cylinder 103 in the Z-axis direction toward a ceiling 122 of the engine room. Although not specifically shown, the configuration of each suction port of the remaining exhaust duct 22 to 26 is similar to that of the exhaust duct 21.

Further, as shown in FIG. 9, the plurality of exhaust ducts 21 to 26 is connected to the exhaust duct 27. The exhaust duct 27 is a duct leading to the outside of the engine room, and is laid in the vicinity of the ceiling 122 of the engine room, for example, as shown in FIG. 9. The exhaust duct 27 merges the suction gas guided from each of the plurality of exhaust ducts 21 to 26 and guides the suction gas to the outside of the engine room. For example, a pipe leading to the outside of the ship is connected to the exhaust port of the exhaust duct 27. In this case, the exhaust duct 27 guides the fuel leakage gas in the suction gas guided from each of the plurality of exhaust ducts 21 to 26 from the engine room to the outside of the ship. Alternatively, the exhaust port of the exhaust duct 27 may be connected to a gas treatment device provided in the ship. In this case, the fuel leakage gas in the suction gas guided from each of the plurality of exhaust ducts 21 to 26 to the exhaust duct 27 may be stored after being subjected to treatment such as dissolution in water by the gas treatment device. On the outer wall of the exhaust ducts 21 to 27, a reinforcing member such as a rib may be provided to suppress the vibrations of the exhaust ducts 21 to 27 caused by shaking of the ship or the like.

Note that a suction fan 3 and a shutoff valve 17 are similar to those of the foregoing first embodiment (e.g., similar in the suction function, arrangement, and the like) except that the suction fan 3 and the shutoff valve 17 are provided in the middle of the exhaust duct 27. Further, in the third embodiment, a plurality of suction fans 3 may be provided corresponding to the plurality of exhaust ducts 21 to 26. For example, each of the plurality of suction fans 3 may be disposed in the vicinity of each suction port of the plurality of exhaust ducts 21 to 26, may be disposed in the middle of each suction port, or may be provided in the vicinity of each junction with the exhaust duct 27. Specifically, from the viewpoint of detecting the fuel leakage gas in the suction gas, each of the plurality of suction fans 3 is preferably disposed on the downstream side of the suction gas from the plurality of detectors 11*a* to 11*f*. From the viewpoint of reducing the weight (load) applied to the expansion/contraction unit 5 and the deformable unit 16, the plurality of suction fans 3 is preferably disposed on the downstream side of the expansion/contraction unit 5 and the deformable unit 16 from the suction gas.

The plurality of exhaust hoods 44 is an example of a hood that easily sucks the fuel leakage gas from the marine internal combustion engine 101 into the inside of the plurality of exhaust ducts 21 to 26. In detail, as shown in FIG. 9, each of the plurality of exhaust hoods 44 is formed in a tapered shape or the like expanding downward from the plurality of exhaust ducts 21 to 26 side, and is connected to the vicinity of the suction ports (e.g., the suction port 21*a* shown in FIG. 12) of the plurality of exhaust ducts 21 to 26. For example, as shown in FIG. 12, the exhaust hood 44 connected to the exhaust duct 21 opens larger than the exhaust duct 21 from the exhaust ducts 21 toward the engine upper unit 102, and communicates the engine upper unit 102 side with the inside of the exhaust duct 21. The opening 44*a* of the exhaust hood 44 is larger than the suction port 21*a* of the exhaust duct 21 and faces the cylinder 103 side as shown in FIG. 12. Note that the exhaust hoods 44 connected to the other exhaust ducts 22 to 26 are similar to the exhaust hoods 44 connected to the exhaust ducts 21.

Further, the exhaust hood 44 in the third embodiment covers the upper side of the plurality of cylinders 103 in the engine upper unit 102 of the marine internal combustion engine 101. For example, as shown in FIGS. 9 and 10, the plurality of exhaust hoods 44 is arranged adjacent to each other in the arrangement direction (the X-axis direction in FIGS. 9 and 10) of the plurality of cylinders 103, and covers the upper sides of the plurality of cylinders 103. Each of the plurality of exhaust hoods 44 receives the suction gas by the suction fan 3 from the cylinder 103 side, and concentrates the received suction gas on the suction port of the exhaust ducts 21 to 26 without leaking to the outside. Preferably, the plurality of exhaust hoods 44 covers the plurality of cylinders 103 from directly above the marine internal combustion engine 101.

Each of the plurality of expansion/contraction units 5 is an example of a pipeline that allows the plurality of exhaust ducts 21 to 26 to expand/contract in the Z-axis direction. Note that the functions and configurations of the plurality of expansion/contraction units 5 are similar to those of the expansion/contraction unit 5 of the foregoing first embodiment. In the exhaust system 1B, the plurality of exhaust ducts 21 to 26, the plurality of exhaust hoods 44, and the like can be housed between a first rail 131 and a pair of second rails 132 (see FIG. 5) of an overhead crane 130 and the ceiling 122 by the action of the plurality of expansion/contraction units 5. As a result, similarly to the exhaust system 1 of the foregoing first embodiment, the exhaust system 1B can retract upward from the traveling track of the overhead crane 130 (see FIG. 5).

Note that the plurality of exhaust ducts 21 to 26 described above may be detachably separated from the plurality of exhaust hoods 44. In this case, the plurality of expansion/contraction units 5 may cause the plurality of exhaust ducts 21 to 26 separated from the plurality of exhaust hoods 44 to retract upward from the traveling track of the overhead crane 130 (see FIG. 6) of the engine room together with the plurality of deformable units 16, which is substantially similar to the foregoing first embodiment.

Each of the plurality of shields 6 shields at least the cylinder 103 of the engine upper unit 102 of the marine internal combustion engine 101. For example, as shown in FIG. 12, one shield 6 includes a plurality of curtains 7 and a storage unit 8 that stores the plurality of curtains 7 such that the plurality of curtains 7 can be taken in and out, and shields one cylinder 103 with the plurality of curtains 7 at a pinpoint. Note that functions and configurations of the plurality of shields 6 are similar to those of the shield 6 of the foregoing first embodiment except that a region of each cylinder 103 or the like of the engine upper unit 102 is shielded at a pinpoint.

Each of the plurality of floodlight units 9 illuminates the engine upper unit 102 of the marine internal combustion engine 101. In detail, as shown in FIG. 11, the plurality of floodlight units 9 is communicably connected to the controller 15B, and operates based on control by the controller 15B. The plurality of floodlight units 9 respectively projects light to a plurality of targets (e.g., the cylinder 103 and the like) of the engine upper unit 102 which may become dark due to a shadow of the exhaust hood 44 and the like. As a result, the plurality of floodlight units 9 illuminates the plurality of targets of the engine upper unit 102 at a pinpoint.

Each of the plurality of detectors 11*a* to 11*f* detects the fuel leakage gas sucked into the inside of each of the plurality of exhaust ducts 2 by the suction fan 3. In detail, as shown in FIGS. 9 and 11, the plurality of detectors 11*a* to 11*f* is provided at predetermined sites of the exhaust ducts 21 to 26, and is communicably connected to the controller 15B. For example, a sensor (not shown) of the detector 11*a* of the exhaust duct 21 is provided in the vicinity of the suction port 21*a* of the exhaust duct 21. Each of the plurality of detectors 11*a* to 11*f* is preferably disposed on the upstream side of the suction gas from the suction fan 3. Each of the plurality of detectors 11*a* to 11*f* has a detection function similar to that of the detector 11 of the foregoing first embodiment. For example, the detector 11*a* of the exhaust duct 21 detects the presence or absence or the content of the fuel leakage gas in the suction gas sucked into the exhaust duct 21, and transmits a detection signal indicating the detection result to the controller 15B. The detector 11*b* of the exhaust duct 22 detects the presence or absence or the content of the fuel leakage gas in the suction gas sucked into the exhaust duct 22, and transmits a detection signal indicating the detection result to the controller 15B. Note that the same applies to the detectors 11*c* to 11*f* of the remaining exhaust ducts 23 to 26.

Each of the plurality of notification units 12 notifies the presence or absence of the fuel leakage gas (i.e., the presence or absence of the leakage of the fuel leakage gas) in the suction gas sucked into the plurality of exhaust ducts 21 to 26. In detail, each of the plurality of notification units 12 is configured similarly to the notification unit 12 of the foregoing first embodiment, and is communicably connected to the controller 15B as shown in FIG. 11. For example, among the plurality of notification units 12, the notification unit 12 corresponding to the exhaust duct 21 is provided in the vicinity of the lower part of the exhaust hood 44 (the outer wall surface of the storage unit 8 of the shield 6 in FIG. 12) as shown in FIG. 12. The plurality of notification units 12 notifies the presence or absence of the fuel leakage gas in the suction gas in the plurality of exhaust ducts 21 to 26 for each exhaust duct based on the control signal from the controller 15B. At this time, each of the plurality of notification units 12 may output visual information that is visually recognizable such as light, may output audibly recognizable auditory information such as sound, or may be configured to cooperate with the safety monitoring device in the engine room, similarly to the notification unit 12 of the foregoing first embodiment.

Note that the installation positions of the plurality of notification units 12 are not limited to the outer wall surface of the storage unit 8 shown in FIG. 12, and may be a desired position in the marine internal combustion engine 101 or a desired position in the engine room as in the foregoing first embodiment. Further, each of the plurality of notification units 12 may notify the presence or absence of the fuel leakage gas in the suction gas for each exhaust duct by outputting a combination of the visual information and the auditory information described above.

The plurality of watering units 13 is devices that clean and reduce, for each cylinder, a large amount of the fuel leakage gas leaking from the plurality of cylinders 103 of the marine internal combustion engine 101. In detail, each of the plurality of sprinklers 13 is configured similarly to the sprinkler 13 of the foregoing first embodiment, and is communicably connected to the controller 15B as shown in FIG. 11. Each operation of the plurality of sprinklers 13 is controlled by the controller 15B in the same manner as in the first embodiment. The plurality of sprinklers 13 sprays water on the cylinder 103 from which a large amount of the fuel leakage gas has leaked among the plurality of cylinders 103, and thus the fuel leakage gas leaking from the cylinder 103 in a large amount is cleaned (scrubbed) with water. In this manner, the plurality of sprinklers 13 reduces the amount of leaked fuel leakage gas for each cylinder at a pinpoint.

The controller 15B controls the operation of the exhaust system 1B. In detail, as shown in FIG. 11, the controller 15B receives an instruction signal from the operation unit and controls each operation of the suction fan 3, the plurality of expansion/contraction units 5 corresponding to the plurality of exhaust ducts 21 to 26, the plurality of shields 6, and the plurality of floodlight units 9 based on the received instruction signal. Note that the control of the controller 15B for each of the suction fan 3, the expansion/contraction unit 5, the shield 6, and the floodlight unit 9 is similar to that of the controller 15 of the foregoing first embodiment. In the case in which a plurality of suction fans 3 is provided corresponding to the plurality of exhaust ducts 21 to 26, the controller 15B controls each of the plurality of suction fans 3 for each of the plurality of exhaust ducts 21 to 26. The control of each of the plurality of suction fans 3 by the controller 15B is similar to the controller 15 of the foregoing first embodiment.

Further, the controller 15B controls each operation of the plurality of notification units 12 and the plurality of sprinklers 13 based on each detection signal from the plurality of detectors 11*a* to 11*f*. For example, in the case in which the detector 11*a* detects the fuel leakage gas, the controller 15B receives a detection signal from the detector 11*a*, and controls the notification unit 12 of the exhaust ducts 21 to notify that the fuel leakage gas is present based on the received detection signal. On the other hand, in the case in which no fuel leakage gas is detected by the detector 11*a*, the controller 15B does not receive the detection signal from the detector 11*a*, and controls the notification unit 12 of the exhaust ducts 21 to notify that there is no fuel leakage gas based on the detection signal. The controller 15B also controls each notification unit 12 of the other exhaust ducts 22 to 26 in the same manner as described above based on each detection signal of each of the detectors 11*b* to 11*f*. Note that the controller 15B may determine the presence or absence of the fuel leakage gas in the suction gas in each of the plurality of exhaust ducts 21 to 26 based on the content of the fuel leakage gas as in the foregoing first embodiment.

Further, the controller 15B acquires the content of the fuel leakage gas in the suction gas in each of the plurality of exhaust ducts 21 to 26 based on the detection signals from the plurality of detectors 11*a* to 11*f*. In this case, the controller 15B controls each of the sprinklers 13 of the plurality of exhaust ducts 21 to 26 to spray water when the content of the fuel leakage gas exceeds the threshold value, similarly to the foregoing first embodiment.

The deformable unit 16 is an example of a pipeline that can be bent and deformed, and a plurality of the deformable units is provided corresponding to the plurality of exhaust ducts 21 to 26. In detail, each of the plurality of deformable units 16 is formed of a bendable pipe such as a bellows-shaped pipe or an elastic pipe, and is provided in the middle of the plurality of exhaust ducts 21 to 26 (e.g., a portion closer to the suction port than the expansion/contraction unit 5) as shown in FIG. 9. The plurality of deformable units 16 forms a bendable pipeline for each of the plurality of exhaust ducts 21 to 26. Each of the plurality of exhaust ducts 21 to 26 can easily change the region where the suction ports face each other by the action (bending deformation) of the deformable unit 16.

Figure 13:
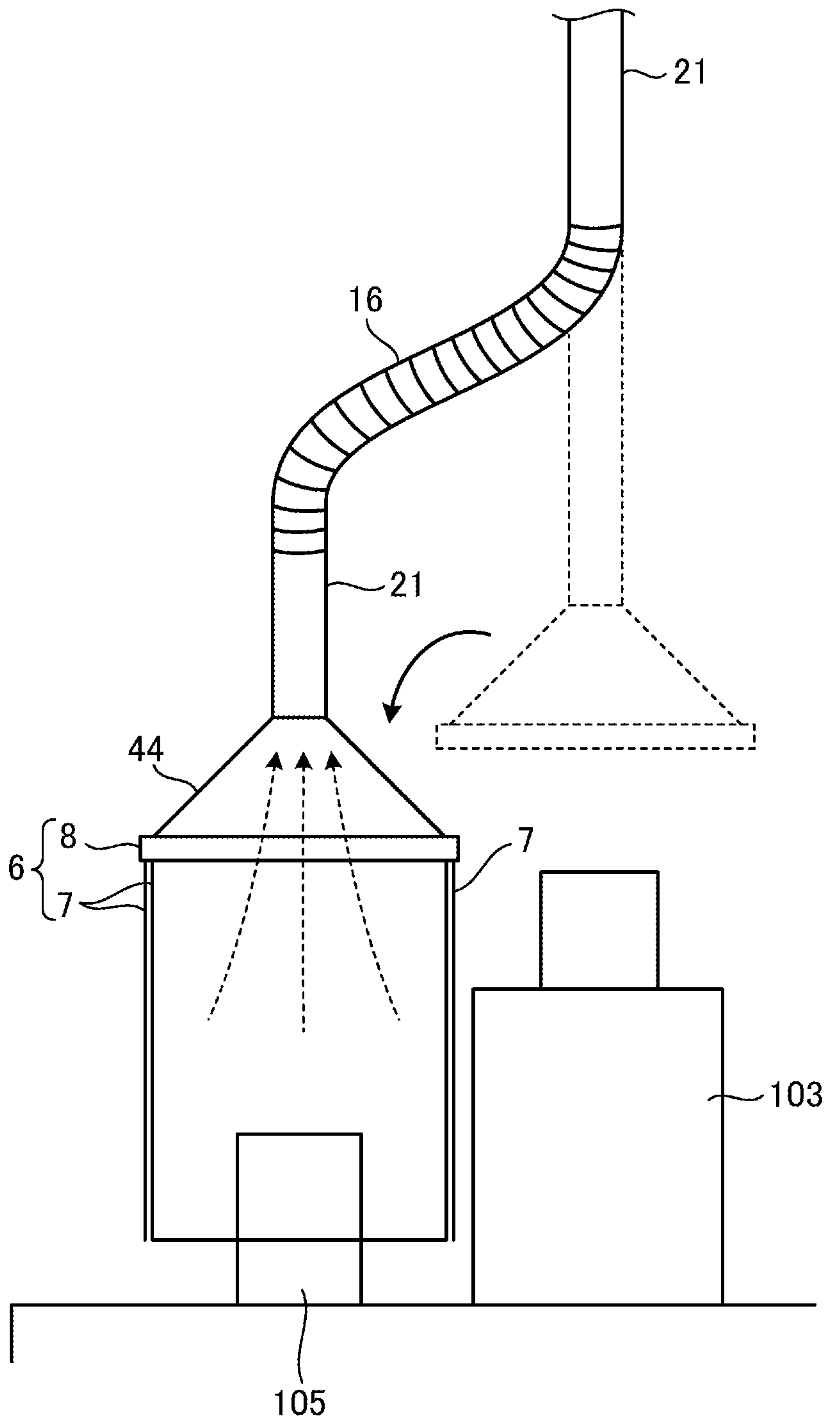
FIG. 13 is a schematic diagram showing a state where the exhaust duct according to the third embodiment of the present disclosure is bent and deformed by a deformable unit.

FIG. 13 is a schematic diagram showing a state where the exhaust duct according to the third embodiment of the present disclosure is bent and deformed by the deformable unit. For example, as shown in FIG. 13, the deformable unit 16 is provided in the middle of the exhaust duct 21. The deformable unit 16 can be easily bent and deformed, for example, when an operator applies a force to the deformable unit 16 by holding the exhaust duct 21, the exhaust hood 44, and the like.

Specifically, as shown in FIG. 13, the exhaust duct 21 can change from a state of covering the upper side of the cylinder 103 at a pinpoint to a state of covering the upper side of the second fuel pump 105 for an alternative fuel at a pinpoint as the deformable unit 16 is bent and deformed. In this state, the shield 6 shields the second fuel pump 105 by the plurality of curtains 7 taken out from the storage unit 8. The exhaust hood 44 covers the upper side of the second fuel pump shielded by the shield 6 at a pinpoint. The suction gas is fed into the inside of the exhaust duct 21 from the second fuel pump 105 side through the exhaust hood 44 by the suction fan 3 (see FIG. 9). For example, at the time of maintenance of the second fuel pump 105 by the operator, as shown in FIG. 13, when the deformable unit 16 is bent and deformed such that the suction port of the exhaust duct 21 faces the second fuel pump 105 from above, the fuel leakage gas leaking from the second fuel pump 105 can be efficiently sucked into the inside of the exhaust duct 21.

Note that although FIG. 13 shows the action of bending and deformation of the deformable unit 16 in the exhaust duct 21, the deformable unit 16 can be similarly bent and deformed for other exhaust ducts 22 to 26. Further, the object to which the suction port of the exhaust ducts 21 to 26 is made to face by the bending and deformation of the deformable unit 16 is not limited to the cylinder 103 and the second fuel pump 105 described above, and may be a desired portion in the engine upper unit 102 of the marine internal combustion engine 101, such as the first fuel pump 104 and the pipe.

As described above, in the exhaust system 1B according to the third embodiment of the present disclosure, the plurality of exhaust ducts 21 to 26 is provided so as to open (direct the suction port) toward each of the plurality of cylinders 103 in the engine upper unit 102 of the marine internal combustion engine 101, and the others are similar to those in the first embodiment. Therefore, it is possible to obtain the benefit of the same operational effects as those of the foregoing first embodiment, and it is possible to sufficiently exhaust the fuel leakage gas to the outside of the engine room by sucking the fuel leakage gas at a pinpoint from the cylinder 103 side where the leakage of the fuel leakage gas easily occurs in the engine upper unit 102.

Further, in the exhaust system 1B according to the third embodiment of the present disclosure, the deformable unit 16 that can be bent and deformed is provided in each of the plurality of exhaust ducts 21 to 26. Therefore, the suction ports of the plurality of exhaust ducts 21 to 26 can be directed in a desired direction along with the bending and deformation of the deformable unit 16. As a result, each of the plurality of exhaust ducts 21 to 26 can be changed from a state of covering the upper side of the cylinder 103 to a state of covering the upper side of a portion where the leakage of the fuel leakage gas is likely to occur in the engine upper unit 102, such as the second fuel pump 105. As a result, in maintenance or the like of the engine upper unit 102, since the suction port of any one of the plurality of exhaust ducts 21 to 26 can be directed to a portion where the leakage of the fuel leakage gas is likely to occur at a pinpoint, the fuel leakage gas can be efficiently sucked from the portion of the engine upper unit 102, and work such as maintenance of the engine upper unit 102 can be safely performed.

Fourth Embodiment

Figure 14:
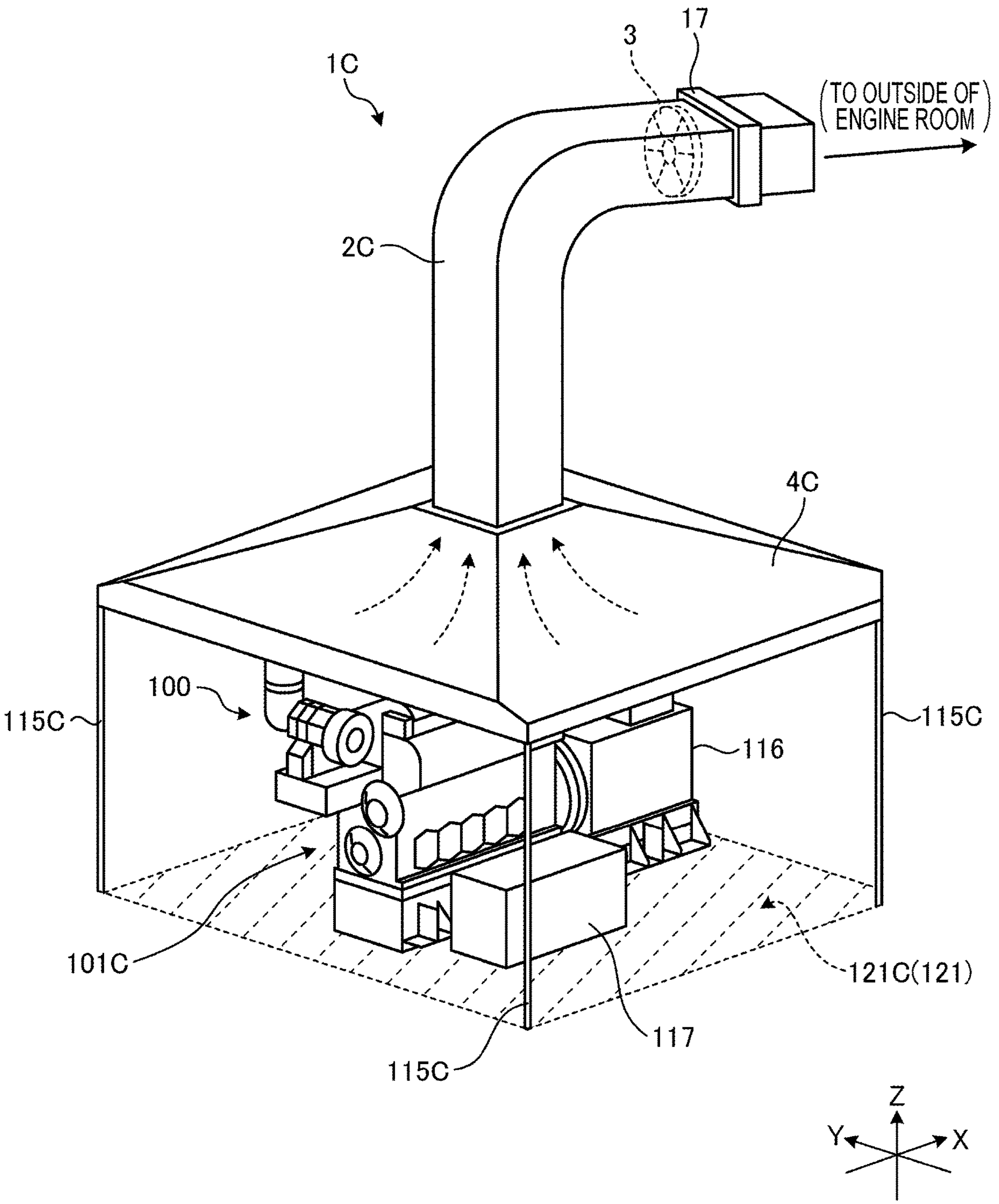
FIG. 14 is a perspective view showing a configuration example of an exhaust system according to a fourth embodiment of the present disclosure.
Figure 15:
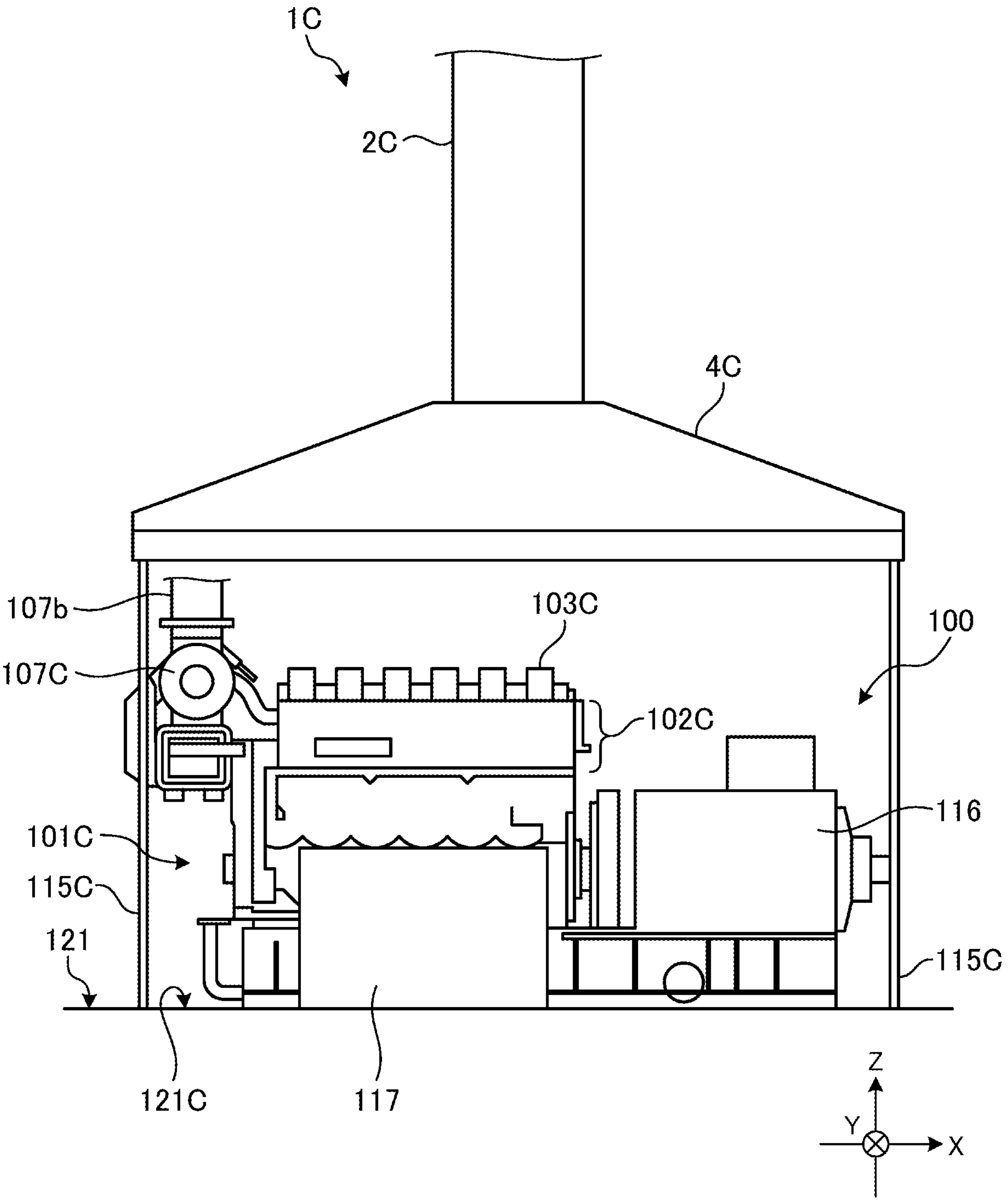
FIG. 15 is a diagram of the exhaust system shown in FIG. 14 as viewed from the Y-axis direction.
Figure 16:
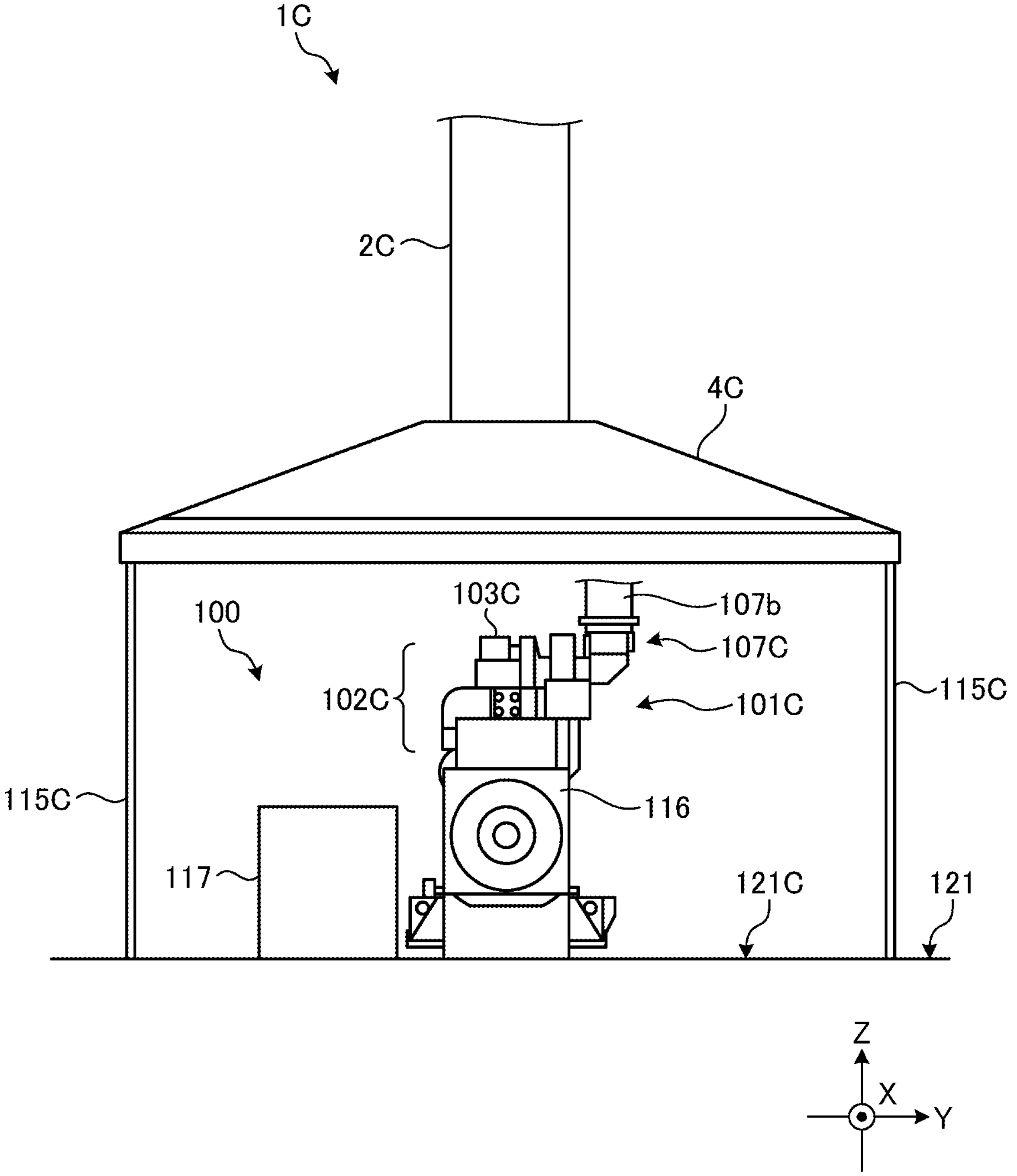
FIG. 16 is a diagram of the exhaust system shown in FIG. 14 as viewed from an X-axis direction.
Figure 17:
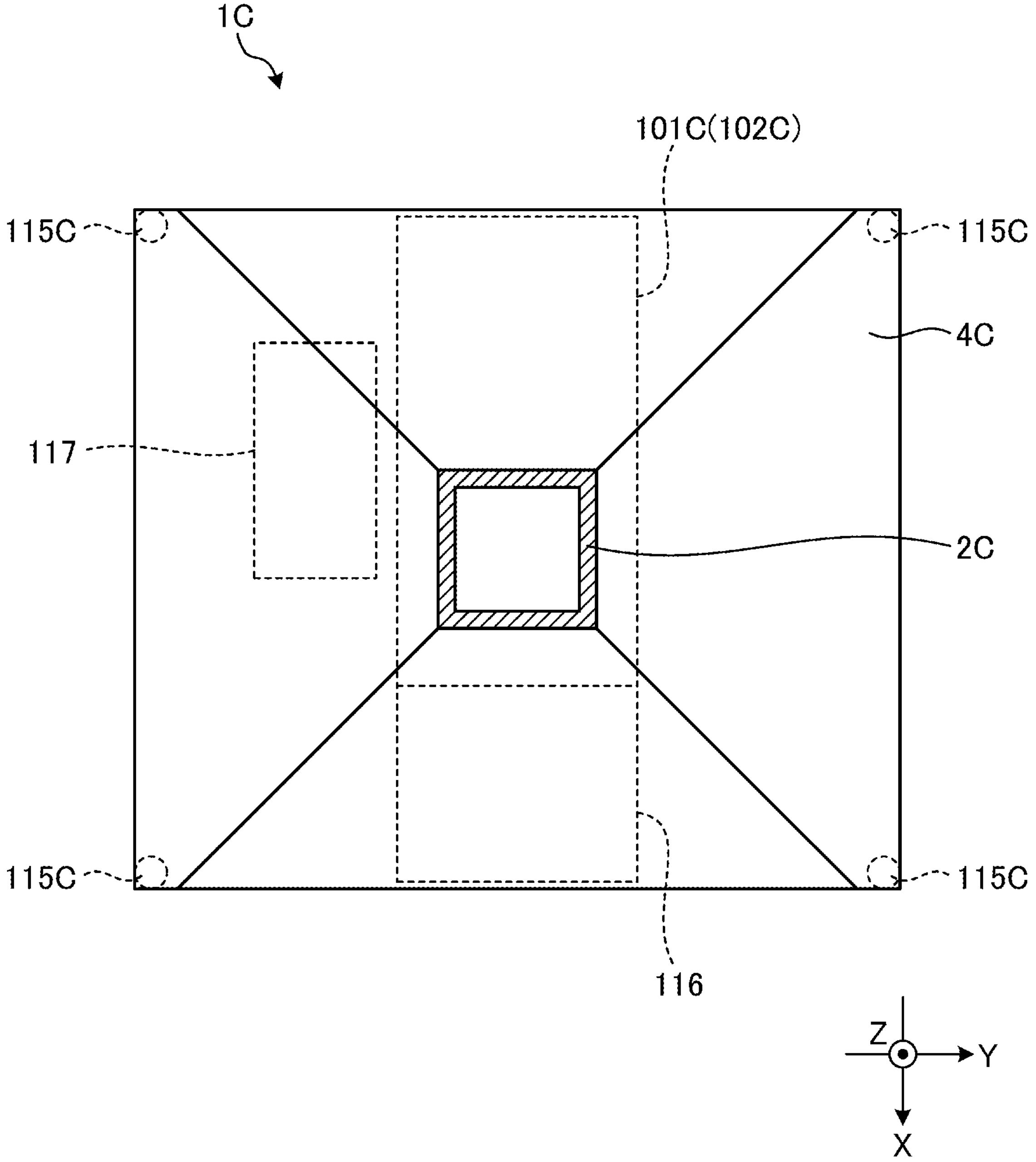
FIG. 17 is a diagram of an exhaust hood of the exhaust system shown in FIG. 14 as viewed from the Z-axis direction.

Next, an exhaust system according to a fourth embodiment of the present disclosure will be described. FIG. 14 is a perspective view showing a configuration example of an exhaust system according to the fourth embodiment of the present disclosure. FIG. 15 is a diagram of the exhaust system shown in FIG. 14 as viewed from the Y-axis direction. FIG. 16 is a diagram of the exhaust system shown in FIG. 14 as viewed from the X-axis direction. FIG. 17 is a diagram of the exhaust hood of the exhaust system shown in FIG. 14 as viewed from the Z-axis direction. As shown in FIGS. 14 to 17, an exhaust system 1C according to the fourth embodiment includes an exhaust duct 2C instead of the exhaust duct 2 of the exhaust system 1 according to the foregoing first embodiment, includes an exhaust hood 4C instead of the exhaust hood 4, and further includes a post 115C that supports the exhaust hood 4C. Other configurations are the same as those of the first embodiment, and the same components are denoted by the same reference numerals.

A marine internal combustion engine 101C as a target in the fourth embodiment is, for example, an internal combustion engine of a type that operates by burning (mix-combusting) an ignition fuel and an alternative fuel in a combustion chamber of a cylinder, and is applied to an internal combustion engine system 100 of a ship. The internal combustion engine system 100 is a system that performs a function necessary for operation of a ship, such as a diesel generator, and includes a marine internal combustion engine 101C and an ancillary device attached to the marine internal combustion engine 101C.

For example, in the case in which the internal combustion engine system 100 is a diesel generator, as shown in FIGS. 14 to 16, the internal combustion engine system 100 includes a generator 116 and a gas valve unit 117 as ancillary device devices of the marine internal combustion engine 101C. The generator 116 is disposed on the flywheel side of the marine internal combustion engine 101C and is driven by the action of the marine internal combustion engine 101C to generate electric power necessary for the ship. The gas valve unit 117 is a unit that adjusts a gas pressure (injection pressure) when ignition fuel, alternative fuel, or the like is injected into the combustion chamber of the cylinder 103C of the marine internal combustion engine 101. Specifically, the gas valve unit 117 receives a high pressure gas supplied from a gas supply device (not shown) in the ship, and adjusts the pressure of the received high pressure gas to a pressure suitable for fuel injection in the marine internal combustion engine 101C. Note that the ancillary device of the internal combustion engine system 100 may include a device such as a control panel in addition to the power generator 116 and the gas valve unit 117 described above.

The marine internal combustion engine 101C of this internal combustion engine system 100 is a small-sized internal combustion engine (e.g., a four-stroke diesel engine or the like) as compared with the marine internal combustion engine 101 (main engine of a ship) of the foregoing first embodiment, and operates by performing mix-combusting of an ignition fuel and an alternative fuel as described above. As shown in FIGS. 15 and 16, the marine internal combustion engine 101C of this type includes a plurality of (e.g., six) cylinders 103C in an engine upper unit 102C. Although not specifically shown, a piston is housed in the inside of each of the plurality of cylinders 103C so as to be able to reciprocate in the piston axial direction (Z-axis direction). Further, the marine internal combustion engine 101C includes a fuel injection valve, fuel pumps for an ignition fuel and an alternative fuel, and an exhaust manifold. Further, as shown in FIGS. 15 and 16, a supercharger 107C is provided in the engine upper unit 102C of the marine internal combustion engine 101C through a pipe or the like. To the supercharger 107C, an exhaust pipe 107*b* is joined. To the outlet side of the exhaust pipe 107*b*, a device that reduces nitrogen oxides in the exhaust gas discharged from the marine internal combustion engine 101C may be connected. Examples of the device include a selective catalytic reduction (SCR) device and an EGR device. Note that the marine internal combustion engine 101C is not limited to this, and may be of a type that does not include an SCR device or an EGR device. For example, one or more internal combustion engine systems 100 are installed in the same engine room as the marine internal combustion engine 101 as a main engine.

From the internal combustion engine system 100 including the marine internal combustion engine 101C, there is the case in which a fuel leakage gas volatilized from an alternative fuel leaks unintentionally due to damage of a pipe or the like or unavoidably due to the maintenance of the cylinder 103C or the like. Such a fuel leakage gas derived from the alternative fuel is a gas lighter than air as described above, and thus the fuel leakage gas flows upward after leaking from the internal combustion engine system 100.

Note that in the fourth embodiment, a ship means a ship including the internal combustion engine system 100 in addition to the marine internal combustion engine 101 as a main engine. The engine room means the engine room of a ship in which the marine internal combustion engine 101 and the internal combustion engine system 100 are installed. Further, in the fourth embodiment, focusing on the internal combustion engine system 100, the fuel leakage gas means the fuel leakage gas leaked from the internal combustion engine system 100. The fuel leakage gas may be volatilized after leaking in the liquid phase from the internal combustion engine system 100, or may be in the gas phase before leaking and leaked in the gas phase from the internal combustion engine system 100.

The exhaust system 1C according to the fourth embodiment sucks the fuel leakage gas leaked from the internal combustion engine system 100 upward from the engine upper unit 102C side of the marine internal combustion engine 101C and exhausts the fuel leakage gas to the outside of the engine. As shown in FIGS. 14 to 17, for example, this exhaust system 1C includes the exhaust duct 2C, a suction fan 3, an exhaust hood 4C, a shutoff valve 17, and a post 115C.

The exhaust duct 2C is an example of a pipeline that guides (exhausts) the fuel leakage gas leaked from the internal combustion engine system 100 installed in the engine room of the ship to the outside of the engine room, and is provided above the internal combustion engine system 100. In detail, as shown in FIGS. 14 to 16, the exhaust duct 2C is provided above the marine internal combustion engine 101C so as to open from above the internal combustion engine system 100 toward the engine upper unit 102C of the marine internal combustion engine 101C. At this time, the exhaust duct 2C may be laid so as to form an independent exhaust path for each marine internal combustion engine 101C in the engine room, or may be laid so as to form an exhaust path (joint path) common to the plurality of marine internal combustion engines 101C. Further, the exhaust duct 2C may be laid at a position lower than the exhaust duct 2 of the foregoing first embodiment, or may be laid along the ceiling of the engine room as in the foregoing first embodiment.

A suction port (not shown) of the exhaust duct 2C is an opening (opening leading to the exhaust hood 4C) that receives a suction gas by the suction fan 3, and is opened from above the internal combustion engine system 100 toward an engine upper unit 102C of the marine internal combustion engine 101C. From the viewpoint of further shortening the suction path of the fuel leakage gas from the internal combustion engine system 100 to the exhaust duct 2C, the exhaust duct 2C preferably opens toward the engine upper unit 102C from directly above the marine internal combustion engine 101C having a high possibility of generating the fuel leakage gas in the internal combustion engine system 100. That is, the suction port of the exhaust duct 2C is preferably positioned directly above the marine internal combustion engine 101C. Here, the position directly above the marine internal combustion engine 101C is a position in a virtual projection plane obtained by projecting the entire area of the engine upper unit 102C including the cylinder 103C and the like of the marine internal combustion engine 101C in the Z-axis direction toward the ceiling of the engine room.

An exhaust port (not shown) of the exhaust duct 2C is an opening on the side opposite to the suction port in the exhaust duct 2C, and communicates with the outside of the engine room. Similarly to the exhaust duct 2 of the foregoing first embodiment, the exhaust port of the exhaust duct 2C may be connected to a pipe (not shown) leading to the outside of the ship, or may be connected to a gas treatment device (not shown) provided in the ship. That is, the exhaust duct 2C may guide the fuel leakage gas sucked by the suction fan 3 from the internal combustion engine system 100 from the engine room to the outside of the ship, or may guide the fuel leakage gas from the engine room to the gas treatment device.

Although not specifically shown, a reinforcing member such as a rib may be provided on the outer wall of the exhaust duct 2C to suppress the vibration of the exhaust duct 2C caused by shaking of the ship or the like. FIGS. 14 to 17 show a rectangular duct as an example of the exhaust duct 2C. However, the exhaust duct 2C is not limited to this. For example, the exhaust duct 2C may be a rectangular duct or a duct other than the rectangular duct such as a cylindrical duct.

Further, as shown in FIG. 14, the suction fan 3 and the shutoff valve 17 are provided in the middle of the exhaust duct 2C. In the fourth embodiment, the suction fan 3 is an example of a device that sucks the fuel leakage gas leaked from the internal combustion engine system 100. The function and configuration of the suction fan 3 are similar to those of the foregoing first embodiment except that the source of the fuel leakage gas to be sucked is replaced from the marine internal combustion engine 101 to the internal combustion engine system 100. Further, the function and configuration of the shutoff valve 17 and the relative arrangement with respect to the suction fan 3 are similar to those of the foregoing first embodiment except that the target duct is replaced from the exhaust duct 2 to the exhaust duct 2C.

The exhaust hood 4C is an example of a hood that easily sucks the fuel leakage gas from the internal combustion engine system 100 into the inside of the exhaust duct 2C. In detail, as shown in FIGS. 14 to 16, the exhaust hood 4C is formed in a tapered shape or the like expanding downward from the suction port side of the exhaust duct 2C, and is connected to the vicinity of the suction port of the exhaust duct 2C. The exhaust hood 4C opens larger than the exhaust duct 2C, for example, from the exhaust duct 2C toward the internal combustion engine system 100, and communicates the engine upper unit 102C side of the marine internal combustion engine 101C with the inside of the exhaust duct 2C. That is, the opening of the exhaust hood 4C is larger than the suction port of the exhaust duct 2C, and faces the engine upper unit 102C side as shown in FIGS. 14 to 16. As shown in FIGS. 14 to 17, this exhaust hood 4C covers the upper side of the internal combustion engine system 100.

In detail, as shown in FIGS. 14 to 16, the opening of the exhaust hood 4C faces a specific floor region 121C of the engine room. The specific floor region 121C is a region including a floor surface on which the internal combustion engine system 100 is installed in a floor 121 of the engine room. Specifically, as shown in FIGS. 14 to 16, the specific floor region 121C includes a floor region (in the following, referred to as an internal combustion engine region) in which the marine internal combustion engine 101C is installed and a floor region (in the following, referred to as an ancillary device region) in which an ancillary device attached to the marine internal combustion engine 101C is installed.

For example, the internal combustion engine region includes a floor region in which an internal combustion engine main body including an engine upper unit 102C of the marine internal combustion engine 101C is installed. Furthermore, the internal combustion engine region may include a floor region located below a device (e.g., the supercharger 107C, the exhaust pipe 107*b*, or the like) extending in the X-axis direction or the Y-axis direction from the internal combustion engine main body. Further, the ancillary device region includes a floor region where the generator 116 is installed and a floor region where the gas valve unit 117 is installed. Further, this ancillary device region may include a floor region where ancillary devices (control panels and the like) other than the power generator 116 and the gas valve unit 117 are installed. Further, to the internal combustion engine region and the ancillary device region described above, the specific floor region 121C may include a floor region where an operator who performs work such as maintenance on the internal combustion engine system 100 enters.

In the fourth embodiment, as shown in FIGS. 14 to 16, the exhaust hood 4C covers the upper side of the specific floor region 121C in the floor 121 of the engine room. Specifically, as shown in FIG. 17, the exhaust hood 4C covers the upper side of the engine upper unit 102C of the marine internal combustion engine 101C, the upper side of the generator 116, and the upper side of the gas valve unit 117. As shown in FIGS. 15 and 16, the engine upper unit 102C includes the cylinder 103C of the marine internal combustion engine 101C. That is, the exhaust hood 4C covers at least the upper side of the cylinder 103C. Note that the exhaust pipe 107*b* of the marine internal combustion engine 101C may be laid so as to extend from the lower side of the exhaust hood 4C to the outside, or may be laid so as to extend to the outside of the exhaust hood 4C through a through hole (not shown) formed in the exhaust hood 4C.

The exhaust hood 4C receives the suction gas by the suction fan 3 from the specific floor region 121C side described above, and concentrates the received suction gas to the suction port of the exhaust duct 2C without leaking to the outside of the exhaust hood 4C. In order to more efficiently concentrate the suction gas to the suction port of the exhaust duct 2C, the exhaust hood 4C preferably covers the upper side of the specific floor region 121C from directly above the marine internal combustion engine 101C.

The post 115C is an example of a support that supports the exhaust hood 4C. In detail, the post 115C is erected at a position facing the lower surface (the surface on the negative side in the Z-axis direction) of the exhaust hood 4C in the floor 121 of the engine room. For example, as shown in FIGS. 14 to 17, a plurality of (four in the present embodiment) posts 115C is erected along the outer periphery of the specific floor region 121C where the internal combustion engine system 100 is installed. Further, as shown in FIG. 17, for example, the upper ends of the plurality of posts 115C are joined to the lower surfaces of the corners of the exhaust hood 4C having a rectangular shape in a plan view from above. As shown in FIGS. 14 to 16, the plurality of posts 115C supports the exhaust hood 4C from below. In order to provide an appropriate distance between the exhaust hood 4C and the internal combustion engine system 100, the length of each of the plurality of posts 115C is preferably longer than the height of the engine upper unit 102C of the marine internal combustion engine 101C (the length from the floor 121 to the upper end portion of the engine upper unit 102C). Further, from the viewpoint of supporting the exhaust hood 4C in a well-balanced manner, preferably, the plurality of posts 115C is arranged such that the center of gravity of the virtual polygon having the position of each column 115C as a vertex matches the center of gravity of the rectangular shape formed by the exhaust hood 4C.

Although not shown in FIGS. 14 to 17, the exhaust system 1C may include the expansion/contraction unit 5 similar to that of the foregoing first embodiment in the middle of the exhaust duct 2C in order to expand/contract the exhaust duct 2C in the Z-axis direction. For example, in the case in which the exhaust duct 2C is laid so as to cross the traveling track of the overhead crane 130 (See FIGS. 5 and 6) in the engine room, the exhaust system 1C has to retract the exhaust duct 2C, the exhaust hood 4C, and the like from the traveling track of the overhead crane 130 as necessary. In this case, as in the foregoing first embodiment, when the expansion/contraction unit 5 is provided in a portion of the exhaust duct 2C extending in the Z-axis direction, the exhaust system 1C can retract upward from the traveling track of the overhead crane 130 by the action of the expansion/contraction unit 5.

In the retraction of the overhead crane 130 from the traveling track, the exhaust system 1C may retract both the exhaust duct 2C and the exhaust hood 4C upward from the traveling track (see FIG. 5), or may retract the exhaust duct 2C upward from the traveling track without retracting the exhaust hood 4C (see FIG. 6), as in the foregoing first embodiment. In the case in which the exhaust duct 2C and the exhaust hood 4C are both retracted, each of the plurality of posts 115C is detachably joined to the exhaust hood 4C. In the case in which the exhaust duct 2C is retracted without retracting the exhaust hood 4C, each of the plurality of posts 115C described above may be fixed to the exhaust hood 4C or may be detachably joined. The exhaust duct 2C is detachably connected to the exhaust hood 4C.

On the other hand, the marine internal combustion engine 101C of the internal combustion engine system 100 as a target in the fourth embodiment is an internal combustion engine smaller than the marine internal combustion engine 101 as the main engine in the foregoing first embodiment. Therefore, in the engine room, the exhaust duct 2C may be laid below the traveling track of the overhead crane 130 so as not to cross the traveling track. In this case, since the exhaust system 1C does not have to retract the exhaust duct 2C and the like from the traveling track of the overhead crane 130, the expansion/contraction unit 5 described above may not be provided in the middle of the exhaust duct 2C.

Although not shown in FIGS. 14 to 17, the exhaust system 1C may include the shield 6 similar to that of the foregoing first embodiment. In this case, the shield 6 is provided at the lower part of the exhaust hood similarly to the foregoing first embodiment. The exhaust system 1C can shield the internal combustion engine system 100 and the specific floor region 121C where the internal combustion engine system is installed from both sides in the X-axis direction and the Y-axis direction by the action of the shield 6 (specifically, the action of the plurality of curtains 7).

Further, the exhaust system 1C may include a floodlight unit 9, a detector 11, a notification unit 12, and a sprinkler 13 as in the foregoing first embodiment. As a result, the exhaust system 1C can obtain the benefit of the operations and effects of the floodlight unit 9, the detector 11, the notification unit 12, and the sprinkler 13, similarly to the foregoing first embodiment. Further, similarly to the foregoing first embodiment, the exhaust system 1C may include an operation unit 10 and a controller 15, and may manually operate each operation of the suction fan 3, the expansion/contraction unit 5, the shield 6, and the floodlight unit 9, or may automatically control each operation of the suction fan 3, the expansion/contraction unit 5, the shield 6, the floodlight unit 9, the detector 11, the notification unit 12, and the sprinkler 13.

As described above, the exhaust system 1C according to the fourth embodiment of the present disclosure includes the exhaust duct 2C provided above the marine internal combustion engine 101C of the internal combustion engine system 100 installed in the engine room of a ship, the suction fan 3 that sucks the fuel leakage gas leaked from the internal combustion engine system 100 from the engine upper unit 102C side of the marine internal combustion engine 101C into the inside of the exhaust duct 2C, and the exhaust hood 4C that is open larger than the exhaust duct 2C and communicates the engine upper unit 102C side with the inside of the exhaust duct 2C. The exhaust hood 4C covers the upper side of the internal combustion engine system 100, and the other configurations are similar to those of the first embodiment. Therefore, even in the case in which the marine internal combustion engine 101C is an internal combustion engine smaller than the main engine (marine internal combustion engine 101) of the ship, it is possible to obtain the benefit of the same operational effects as those of the foregoing first embodiment with respect to the internal combustion engine system 100 including the marine internal combustion engine 101C, and thus it is possible to exhaust the fuel leakage gas from the internal combustion engine system 100 sufficiently and efficiently without diffusing the fuel leakage gas into the engine room.

Note that in the foregoing first to fourth embodiments, one suction fan 3 is provided for each exhaust duct. However, the present disclosure is not limited to this. For example, a plurality of suction fans 3 may be provided in the inside of the exhaust duct or the exhaust hood.

Further, in the foregoing first to fourth embodiments, the floodlight unit 9 is provided on the inner wall surface of the exhaust duct. However, the present disclosure is not limited to this. For example, the floodlight unit 9 may be provided on the outer wall surface of the exhaust hood, or may be provided on a part other than the exhaust hood, such as the outer wall surface of the suction port of the exhaust duct.

Further, in the foregoing first to third embodiments, the exhaust hood is provided on the suction port side of the exhaust duct. However, the present disclosure is not limited to this. For example, the exhaust hood may not be provided on the suction port side of the exhaust duct.

Further, in the foregoing first to third embodiments, at least the cylinder 103 of the engine upper unit 102 of the marine internal combustion engine 101 is shielded by the plurality of curtains 7 of the shield 6. However, the present disclosure is not limited to this. For example, an air blower may be provided in the engine upper unit 102 or the like, and an air curtain that shields at least the cylinder 103 of the engine upper unit 102 may be generated by a rising flow gas rising from the air blower toward the exhaust duct. Further, the air blower (air curtain) may be provided in the exhaust system 1C according to the foregoing fourth embodiment.

Further, in the foregoing first to fourth embodiments, the storage type shield 6 including the storage unit 8 that stores the plurality of curtains 7 such that the curtains 7 can be taken in and out is exemplified. However, the present disclosure is not limited to this. For example, the shield 6 may keep the plurality of curtains 7 made of a material such as a non-flammable or fire-resistant resin out at all times without housing. The plurality of curtains 7 may be provided so as to hang down from the suction port of the exhaust duct or the opening of the exhaust hood, or may be provided so as to erect upward from the upper passage 109 side of the marine internal combustion engine 101. Further, the plurality of curtains 7 may be flexible to be deformed, such as being curved, or may be hard members such as plates. The plurality of curtains 7 may be provided with entrance portions, slits, and the like through which operators can enter and exit.

Further, in the foregoing second embodiment, the exhaust hood covers the upper side of the region on the cylinder 103 side of the engine upper unit 102 from the supercharger 107. However, the present disclosure is not limited to this. For example, the region of the engine upper unit 102 of which the upper side is covered by the exhaust hood or the exhaust duct may be the entire region or a partial region of the inner region surrounded by the upper fence 110 as long as the region includes the cylinder 103 and excludes the supercharger 107.

Further, in the foregoing third embodiment, the exhaust hoods as many as the plurality of (e.g., six) cylinders 103 included in the engine upper unit 102 of the marine internal combustion engine 101 are provided. However, the present disclosure is not limited to this. For example, the exhaust hood provided on the suction port side of the plurality of exhaust ducts may be a single exhaust hood collectively covering the upper side of the plurality of cylinders 103, or may be a combination of a first exhaust hood collectively covering the upper side of two or more cylinders among the plurality of cylinders 103 and one or more second exhaust hoods covering the upper side of the remaining one or more cylinders.

Further, in the foregoing fourth embodiment, the lower surface of each corner portion of the exhaust hood 4C is supported by the plurality of posts 115C. However, the present disclosure is not limited to this. For example, the plurality of posts 115C may support portions (side portions and the like) other than the corners of the exhaust hood 4C. Further, the number of posts 115C supporting the exhaust hood 4C is not limited to four described above, and may be two or more. Further, the support that supports the exhaust hood 4C is not limited to the post (columnar post) described above, and may be a plate-like support or a combination of a plurality of posts or plates.

Further, the present disclosure is not limited by the foregoing first to fourth embodiments, and components configured of appropriately combining the above-described components are also included in the present disclosure. For example, the exhaust systems 1, 1A, and 1C according to the foregoing first, second, and fourth embodiments may include a deformable unit that can be bent and deformed in the middle of the exhaust duct, similarly to the deformable unit 16 of the foregoing third embodiment. Further, in addition to the plurality of exhaust ducts covering the upper side of the plurality of cylinders 103, the exhaust system 1B according to the foregoing third embodiment may further include a large exhaust duct or an exhaust hood covering the upper side of the inner region surrounded by the upper fence 110 of the engine upper unit 102 or the inner specific region excluding the supercharger 107 as in the foregoing first and second embodiments. In addition, other embodiments, examples, operation techniques, and the like made by those skilled in the art based on the foregoing first to fourth embodiments are all included in the scope of the present disclosure.

LIST OF REFERENCE SIGNS

1, 1A, 1B, 1C Exhaust system
2, 2C, 21 to 27 Exhaust duct
2*a*, 21*a* Suction port
3 Suction fan
4, 4C, 14, 44 Exhaust hood
4*a*, 14*a*, 44*a* Opening
5 Expansion/contraction unit
6 Shield
7 Curtain
8 Storage unit
9 Floodlight unit
10 Operation unit
11, 11*a* to 11*f* Detector
12 Notification unit
13 Sprinkler
15B Controller
16 Deformable unit
17 Shutoff valve
100 Internal combustion engine system
101, 101C Marine internal combustion engine
102, 102C Engine upper unit
103, 103C Cylinder
103*a* Fuel injection valve
104 First fuel pump
105 Second fuel pump
106 Exhaust manifold
107, 107C Supercharger
107*a* Intake part
107*b* Exhaust pipe
108 EGR device
109 Upper passage
110 Upper fence
111 Lower passage
112 Lower fence
113 Frame
114 Baseplate
115, 115C Post
116 Generator
117 Gas valve unit
121 Floor
121C Specific floor region
122 Ceiling
130 Overhead crane
131 First rail
132 Second rail

The invention claimed is:

1. An exhaust system comprising:

an exhaust duct including a single exhaust hood that is provided directly above a marine internal combustion engine installed in an engine room of a ship; and a suction fan configured to suck a fuel leakage gas leaking from the marine internal combustion engine into an inside of the exhaust duct, via the single exhaust hood, from an engine upper unit side of the marine internal combustion engine, and wherein the exhaust duct is configured to exhaust the fuel leakage gas sucked by the suction fan to an outside of the engine room.

2. The exhaust system according to claim 1, wherein the single exhaust hood is configured to open larger than the exhaust duct and communicate the engine upper unit with the inside of the exhaust duct, wherein a cylinder of the marine internal combustion engine is included in the engine upper unit, and wherein the single exhaust hood is configured to cover at least an upper side of the cylinder.

3. The exhaust system according to claim 2, wherein the marine internal combustion engine includes:

an upper passage provided along the engine upper unit; and a fence erected along an outer edge of the upper passage, and the single exhaust hood is configured to cover an upper side of an inner region surrounded by the fence.

4. The exhaust system according to claim 2, wherein the engine upper unit further includes a supercharger that is configured to suck air from an outside and compress the air, and the marine internal combustion engine includes:

an upper passage provided along the engine upper unit; and a fence erected along an outer edge of the upper passage, and wherein the single exhaust hood is configured to cover an upper side of a region excluding the supercharger in an inner region surrounded by the fence.

5. The exhaust system according to claim 1, wherein:

the engine upper unit includes a plurality of cylinders of the marine internal combustion engine, and a plurality of the exhaust ducts is provided so as to open toward each of the plurality of cylinders.

6. The exhaust system according to claim 5, wherein the single exhaust hood is configured to open larger than the exhaust duct from the exhaust duct toward the engine upper unit and communicate the engine upper unit with the inside of the exhaust duct, and wherein the single exhaust hood is configured to cover an upper side of the plurality of cylinders.

7. The exhaust system according to claim 6, wherein a plurality of the single exhaust hoods is provided so as to cover the upper side of the plurality of cylinders.

8. The exhaust system according to claim 1, wherein the exhaust duct includes an expansion/contraction unit that is configured to extend in an approaching direction approaching the engine upper unit and contract in a separating direction separating from the engine upper unit.

9. The exhaust system according to claim 1, wherein the exhaust duct includes a deformable unit that is bendable and deformable.

10. The exhaust system according to claim 2, further comprising a shield that is configured to shield at least the cylinder of the engine upper unit including the cylinder of the marine internal combustion engine.

11. The exhaust system according to claim 1, further comprising:

a detector that is configured to detect the fuel leakage gas sucked into an inside of the exhaust duct by the suction fan;

a notification unit that is configured to generate a notification of a presence or an absence of the fuel leakage gas; and a controller that is configured to control the notification unit to notify that the fuel leakage gas is present based on detection of the fuel leakage gas.

12. The exhaust system according to claim 11, further comprising:

a sprinkler that is configured to spray water on at least the engine upper unit of the marine internal combustion engine, and wherein:

the detector is configured to detect a content of the fuel leakage gas contained in the gas sucked into the inside of the exhaust duct, and the controller is configured to compare a preset threshold with a content of the fuel leakage gas, and control the sprinkler to spray water based on the content of the fuel leakage gas being greater than or equal to the threshold.

13. The exhaust system according to claim 1, further comprising a floodlight unit that is configured to illuminate the engine upper unit.

14. The exhaust system according to claim 2, wherein the exhaust hood is configured to cover an upper side of an internal combustion engine system including the marine internal combustion engine and an ancillary device attached to the marine internal combustion engine.

15. An exhaust system comprising an exhaust duct provided above a marine internal combustion engine installed in an engine room of a ship, the marine internal combustion engine including:

an upper passage provided along the engine upper unit, a fence erected along an outer edge of the upper passage;

an exhaust hood that is configured to open larger than the exhaust duct and communicate the engine upper unit with an inside of the exhaust duct; and a suction fan configured to suck a fuel leakage gas leaking from the marine internal combustion engine into an inside of the exhaust duct from an engine upper unit side of the marine internal combustion engine, wherein the exhaust duct is configured to exhaust the fuel leakage gas sucked by the suction fan to an outside of the engine room, wherein a cylinder of the marine internal combustion engine is included in the engine upper unit, wherein the exhaust hood is configured to cover at least an upper side of the cylinder, and wherein the exhaust hood is configured to cover an upper side of an inner region surrounded by the fence.

16. An exhaust system comprising an exhaust duct provided above a marine internal combustion engine installed in an engine room of a ship, the engine room further including a supercharger that is configured to suck air from an outside and compress the air, and the marine internal combustion engine including:

an upper passage provided along the engine upper unit, a fence erected along an outer edge of the upper passage;

an exhaust hood that is configured to open larger than the exhaust duct and communicate the engine upper unit with an inside of the exhaust duct; and a suction fan configured to suck a fuel leakage gas leaking from the marine internal combustion engine into an inside of the exhaust duct from an engine upper unit side of the marine internal combustion engine, wherein the exhaust duct is configured to exhaust the fuel leakage gas sucked by the suction fan to an outside of the engine room, wherein a cylinder of the marine internal combustion engine is included in the engine upper unit, wherein the exhaust hood is configured to cover at least an upper side of the cylinder, and wherein the exhaust hood is configured to cover an upper side of a region excluding the supercharger in an inner region surrounded by the fence.

* * * * *